United States Patent
Sridhara et al.

(10) Patent No.: US 9,357,411 B2
(45) Date of Patent: May 31, 2016

(54) HARDWARE ASSISTED ASSET TRACKING FOR INFORMATION LEAK PREVENTION

(71) Applicant: QUALCOMM Incorporated, San Diego, CA (US)

(72) Inventors: Vinay Sridhara, Santa Clara, CA (US); Satyajit Prabhakar Patne, San Diego, CA (US); Rajarshi Gupta, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 90 days.

(21) Appl. No.: 14/174,956

(22) Filed: Feb. 7, 2014

(65) Prior Publication Data

US 2015/0230108 A1     Aug. 13, 2015

(51) Int. Cl.
H04W 24/08 (2009.01)
H04W 4/00 (2009.01)
G06F 21/55 (2013.01)

(52) U.S. Cl.
CPC ............. *H04W 24/08* (2013.01); *G06F 21/552* (2013.01); *H04W 4/003* (2013.01)

(58) Field of Classification Search
CPC ..... H04W 24/08; H04W 4/003; G06F 21/552
See application file for complete search history.

(56) References Cited

U.S. PATENT DOCUMENTS

| 7,254,811 | B2 | 8/2007 | Kouznetsov et al. | |
|---|---|---|---|---|
| 8,099,784 | B1* | 1/2012 | Chen et al. | 726/23 |
| 8,341,369 | B2 | 12/2012 | Savagaonkar et al. | |
| 2007/0250927 | A1 | 10/2007 | Naik et al. | |
| 2008/0148343 | A1* | 6/2008 | Taniguchi | 726/1 |
| 2009/0089497 | A1* | 4/2009 | Bulygin et al. | 711/112 |
| 2010/0095281 | A1 | 4/2010 | Raber | |
| 2010/0313270 | A1* | 12/2010 | Kim et al. | 726/24 |
| 2012/0079596 | A1 | 3/2012 | Thomas et al. | |
| 2012/0210423 | A1 | 8/2012 | Friedrichs et al. | |
| 2013/0097706 | A1 | 4/2013 | Titonis et al. | |
| 2013/0268997 | A1* | 10/2013 | Clancy et al. | 726/1 |
| 2013/0312099 | A1* | 11/2013 | Edwards et al. | 726/24 |

* cited by examiner

*Primary Examiner* — Charles E Anya
(74) *Attorney, Agent, or Firm* — The Marbury Law Group, PLLC

(57) ABSTRACT

Mobile computing devices may be equipped with hardware components configured to monitor key assets of the mobile device at a low level (e.g., firmware level, hardware level, etc.). The hardware component may also be configured to dynamically determine the key assets that are to be monitored in the mobile device, monitor the access or use of these key assets by monitoring data flows, transactions, or operations in a system data bus of the mobile device, and report suspicious activities to a comprehensive behavioral monitoring and analysis system of the mobile device. The comprehensive behavioral monitoring and analysis system may then use this information to quickly identify and respond to malicious or performance degrading activities of the mobile device.

20 Claims, 7 Drawing Sheets

HARDWARE ASSISTED ASSET TRACKING FOR INFORMATION LEAK PREVENTION

BACKGROUND

Cellular and wireless communication technologies have seen explosive growth over the past several years. This growth has been fueled by better communications, hardware, larger networks, and more reliable protocols. Wireless service providers are now able to offer their customers an ever-expanding array of features and services, and provide users with unprecedented levels of access to information, resources, and communications. To keep pace with these service enhancements, mobile electronic devices (e.g., cellular phones, tablets, laptops, etc.) have become more powerful and complex than ever, and now commonly include multiple processors, system-on-chips (SoCs), and other resources that allow mobile device users to execute complex and power intensive software applications (e.g., video streaming, video processing, etc.) on their mobile devices. This complexity has created new opportunities for malicious software, software conflicts, hardware faults, and other similar errors or phenomena to negatively impact a mobile device's long-term and continued performance and power utilization levels. Accordingly, new and improved solutions for identifying and correcting conditions and/or mobile device behaviors that may negatively impact the mobile device's long term and continued performance and power utilization levels will be beneficial to consumers.

SUMMARY

The various aspects include methods of analyzing mobile device behaviors, which may include identifying by a processor of a mobile device a resource in the mobile device that is a critical data resource, classifying by the processor the identified resource as a key asset that requires close monitoring, monitoring in a hardware component of the mobile device a data bus in the mobile device to detect an application programming interface (API) call made by a software application to access or use the key asset, providing information obtained by the hardware component of the mobile device regarding API calls made by the software application from the hardware component to a behavioral monitoring and analysis module operating in the processor of the mobile device, and determining in the behavioral monitoring and analysis module whether the access or use of the key asset by the software application is suspicious based in part on the information obtained by the hardware component.

In an aspect, providing information obtained by the hardware component of the mobile device regarding API calls made by the software application from the hardware component to the behavioral monitoring and analysis module operating in the processor of the mobile device includes determining in the hardware component whether the access or use of the key asset by the software application is suspicious, and notifying the behavioral monitoring and analysis module operating in the processor of the mobile device that the access or use of the key asset by the software application is suspicious.

In a further aspect, monitoring in the hardware component the data bus to detect an API call includes monitoring the data bus in a configurable hardware debug component. In a further aspect, classifying the identified resource as the key asset includes receiving in a translation unit of the mobile device information identifying a component in the mobile device as the critical data resource, determining in the translation unit a section of memory that stores information for the component, and adding the determined section of memory to a key asset list stored in a memory of the mobile device.

In a further aspect, the method further includes monitoring an instruction queue to identify an instruction sequence associated with the key asset, determining whether an identified instruction sequence is associated with a malicious activity by comparing the identified instruction sequence to known patterns of malicious activities, and removing the identified instruction sequence from the instruction queue in response to determining that the identified instruction sequence is associated with the malicious activity.

In further aspects, classifying the identified resource as the key asset includes classifying an asset selected from a group including a memory block, a memory address, a memory addresses range, a device address, a register, and a hardware block. In a further aspect, the method may include identifying a pattern of API calls as being indicative of malicious activity by the software application, generating a light-weight behavior signature based on the identified pattern of API calls and the identified mobile device resources, using the light-weight behavior signature to perform behavior analysis operations, and determining whether the software application is malicious or benign based on the behavior analysis operations. In a further aspect, notifying the behavioral monitoring and analysis module includes communicating an identifier of the software application and trace data to one of an observer module and an analyzer module operating in the processor of the mobile device. In a further aspect, the method may include identifying mobile device behaviors that require deeper analysis based on information included in the identifier and trace data.

A further aspect includes methods of analyzing mobile device behaviors, which may include receiving in a translation unit of a mobile device information identifying a component in the mobile device as a critical data resource, determining in a translation unit of the mobile device a section of memory that stores information for the identified component, and adding the determined section of memory to a key asset list stored in memory that is monitored by a behavioral monitoring and analysis module of the mobile device to detect malicious, suspicious or performance degrading behaviors.

Further aspects include a computing device that includes a hardware component configured to detect application programming interface (API) calls made by a software application by monitoring a data bus, and a processor coupled to the hardware component and configured with processor-executable instructions to perform operations of the aspect methods described above.

Further aspects include a non-transitory computer readable storage medium having stored thereon processor-executable software instructions configured to cause a processor to perform operations for analyzing mobile device behaviors of the aspect methods described above.

BRIEF DESCRIPTION OF THE DRAWINGS

The accompanying drawings, which are incorporated herein and constitute part of this specification, illustrate exemplary aspects of the invention, and together with the general description given above and the detailed description given below, serve to explain the features of the invention.

DETAILED DESCRIPTION

Figure 1:
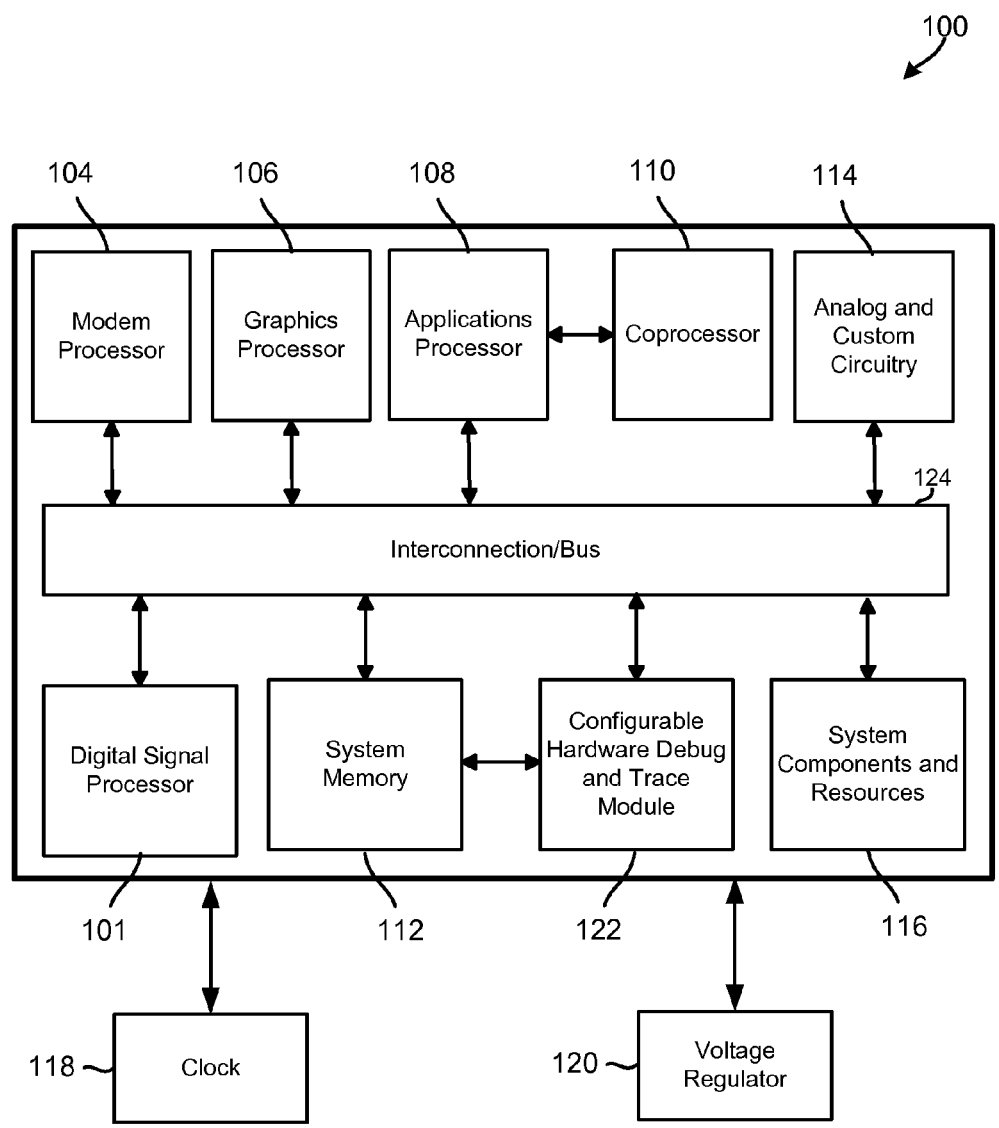
FIG. 1 is an architectural diagram of an example system-on-chip that includes hardware components suitable for implementing the various aspects.

The various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

In overview, the various aspects include mobile computing devices equipped with hardware components configured to monitor key assets of the mobile device at a low level (e.g., firmware level, hardware level, etc.) and report suspicious activities to a comprehensive behavioral monitoring and analysis system of the mobile device. The comprehensive behavioral monitoring and analysis system may then use this information to quickly identify and respond to malicious or performance degrading activities of the mobile device.

In an aspect, the hardware component may be configured to monitor the access or use of key assets by monitoring data flows, transactions, or operations in a system data bus of the mobile device. In an aspect, the hardware component may be configured to dynamically determine (or intelligently select) the key assets that are to be monitored in the mobile device. In another aspect, the hardware component may receive information suitable for identifying the key assets that are to be monitored from the behavioral monitoring and analysis system. In the various aspects, key assets may include memory locations, ranges of memory addresses, device address, instruction queues, hardware modules, registers, etc. that are associated with a feature, application or component of the mobile device.

By utilizing its access to proprietary and non-proprietary hardware in the mobile device to monitor the features of the mobile device at a low level, the hardware component allows the mobile device to make better and more informed decisions regarding the classification, intent, nature, or characteristic of a mobile device or software program at a very early stage in its execution or operations. This in turn allows the mobile device to prevent or respond to malicious and performance degrading behaviors of the mobile device faster and without consuming an excessive amount of its processing, battery, or memory resources.

The terms "mobile computing device" and "mobile device" are used interchangeably herein to refer to any one or all of cellular telephones, smartphones, personal or mobile multi-media players, personal data assistants (PDA's), laptop computers, tablet computers, smartbooks, ultrabooks, palm-top computers, wireless electronic mail receivers, multimedia Internet enabled cellular telephones, wireless gaming controllers, and similar personal electronic devices which include a memory, a programmable processor for which performance is important, and operate under battery power such that power conservation methods are of benefit. While the various aspects are particularly useful for mobile computing devices that have limited resources and run on battery power, such as smartphones, the aspects are generally useful in any electronic device that includes a processor and executes application programs.

The term "performance degradation" is used herein to refer to a wide variety of undesirable mobile device operations and characteristics, such as longer processing times, slower real time responsiveness, lower battery life, loss of private data, malicious economic activity (e.g., sending unauthorized premium SMS message), denial of service (DoS), operations relating to commandeering the mobile device or utilizing the phone for spying or botnet activities, etc.

Generally, the performance and power efficiency of a mobile device degrade over time. Recently, anti-virus companies (e.g., McAfee, Symantec, etc.) have begun marketing mobile anti-virus, firewall, and encryption products that aim to slow this degradation. However, many of these solutions rely on the periodic execution of a computationally-intensive scanning engine on the mobile device, which may consume many of the mobile device's processing and battery resources, slow or render the mobile device useless for extended periods of time, and/or otherwise degrade the user experience. In addition, these solutions are typically limited to detecting known viruses and malware, and do not address the multiple complex factors and/or the interactions that often combine to contribute to a mobile device's degradation over time (e.g., when the performance degradation is not caused by viruses or malware). For these and other reasons, existing anti-virus, firewall, and encryption products do not provide adequate solutions for identifying the numerous factors that may contribute to a mobile device's degradation over time, for preventing mobile device degradation, or for efficiently restoring an aging mobile device to its original condition.

The various aspects include a comprehensive behavioral monitoring and analysis system for efficiently identifying, preventing, and/or correcting the conditions and/or mobile device behaviors that often degrade a mobile device's performance and/or power utilization levels over time. The comprehensive behavioral monitoring and analysis system may include an observer process, daemon, module, or sub-system (herein collectively referred to as a "module"), an analyzer module, and an actuator module. The observer module may be configured to instrument or coordinate various application programming interfaces (APIs), registers, counters or other components (herein collectively "instrumented components") at various levels of the mobile device system, and continuously (or near continuously) monitor mobile device behaviors by collecting behavior information from the instrumented components. The observer module may communicate (e.g., via a memory write operation, function call, etc.) the collected behavior information to the analyzer module, which may apply machine learning techniques to the behavior information to determine whether a mobile device behavior, software application, or process is benign, malicious or otherwise contributing to degradation in performance and power utilization levels of a mobile device over time. The analyzer module may communicate the results of its analysis to the actuator module, which may use this information to heal, cure, isolate, or otherwise fix or respond to the identified problems.

While the above-mention behavioral monitoring and analysis system is generally very effective for detecting malicious applications and preventing the degradation in performance and power utilization levels of a mobile device over time, malicious software applications are growing in sophistication and may evade detection by such systems by attacking the mobile device at the hardware or firmware levels, by masking their operations, by performing the malicious activities as part of the boot sequence prior to the initialization of the behavioral monitoring and analysis system, etc.

The various aspects include mobile devices equipped with a hardware component configured to monitor key assets of a mobile computing device at a low level (e.g., at the kernel, firmware, hardware, or machine levels) to identify a suspicious or malicious activities, events, behaviors, software applications, or processes in the mobile device. For example, the hardware component may be configured to monitor a system bus to detect a suspicious activity or event (e.g., an unauthorized memory access operation, etc.) in a hardware module of the mobile device, and report the detected activity/event (e.g., via a memory write operation, event trigger, etc.) to the observer, analyzer, and/or actuator modules of the mobile device. These modules may use this information to evaluate, analyze, classify, and/or respond to the suspicious activity before it contributes to the degradation in the performance or power consumption characteristics of the mobile device.

By allowing the mobile device to monitor activities/events in the hardware modules, the hardware component allows the mobile device to respond to malicious software applications, data leaks and other potentially performance degrading mobile device behaviors before they have a significant or negative impact on the responsiveness, performance, or power consumption characteristics of the mobile device. The hardware component also allows the mobile device to prevent a malicious software application from attacking the mobile device at the hardware or firmware levels, performing malicious activities as part of a boot sequence prior to the initialization of the behavioral monitoring and analysis system, using time delays to mask its operations, etc.

In the various aspects, the hardware component may be a unified standardized trace mechanism or component configured to trace any or all sources or components in the mobile device. In an aspect, the hardware component may be a programmable and configurable hardware debug module. In addition, the hardware debug module may include any of a variety of hardware and software technologies that enable real-time (or near real-time) collection of information relating to instruction execution, bus transactions, memory accesses, data transfers, processor operations, and other similar events, operations or conditions in the mobile device. For example, the hardware debug module may include trace hardware that is configured to trace events, conditions, and operations in the various chips, hardware blocks, systems, sub-systems, processors, cores, memories and components of the mobile device.

In various aspects, the hardware debug module may be configured to capture instruction flows, instruction sequences, state information, rising-edge hardware events, and/or timing information from various mobile device components, as well as changes in information in the secured or protected memory locations or registers of the device. In an aspect, the hardware debug module may be configured to use this information to perform profiling, debugging, or tracing operations to generate debug or trace data. Such trace data may include hardware block trace data, processor trace data, software trace data, memory trace data, program flow trace data, data flow trace data, bus signaling trace data, USB trace data, etc. The hardware debug module may store the generated trace data, behavior vectors and the results of its monitoring, detection or analysis operations in a system memory, a bidirectional associative memory (BAM), embedded trace buffer (ETB), etc.

The hardware component (e.g., hardware debug module) may be configured to monitor memory locations or other key assets in any or all of the components, sub-systems and processing cores of the mobile device.

In an aspect, the hardware component may be configured to work in conjunction with other modules to dynamically determine the mobile device assets (e.g., memory locations, ranges of memory addresses, device address, instruction queues, modules, registers, etc.) that are key assets. The hardware component may also monitor the access, distribution, or use of the key assets by monitoring data flows, transactions, or operations in a system or data bus of the mobile device to identify suspicious mobile device activities.

For example, the hardware component may be configured to work in conjunction with other modules in the mobile device to classify a section of the mobile device's memory that stores credit card information as a key asset (e.g., by adding a memory address range list of key assets), monitor a data bus to detect memory read operations that target that section of the memory, identify the software application that pushed the read operation onto the data bus, determine whether the software application is authorized to read information from that section of the memory, generate a behavior vector that identifies the suspicious software application, and send the generated behavior vector to the observer and/or analyzer modules for additional security or detailed analysis.

As another example, the hardware debug module may be configured to monitor various device features at a low level (e.g., at the firmware, hardware, or machine levels), monitor an instruction queue to identify instruction sequences or instruction execution patterns that are associated with the monitored features, compare identified sequences/patterns to known patterns of malicious activities, and determine whether an identified sequence/pattern is associated with a malicious activity based on the results of the comparison. The hardware debug module (or another component) may then delete, terminate, purge, stop, or freeze sequences or patterns that are associated with a malicious activity. For example, the hardware debug module may stop or prevent a software application from accessing or using a key asset of the mobile device until the analyzer module determines that the software application is benign.

The hardware debug module may be configured to protect mobile device resources at various logical and/or functional levels of the mobile device systems, such as at the application level, user level, kernel level, framework level, firmware level, hardware level, etc.

The hardware debug module may be configured to prevent access to information or key assets based on the privileges of a requesting software application. Example privileges include whether the software application is authorized to read credit card information, security keys, address book entries, and device IDs from a mobile device memory. Other example privileges include whether the software application is authorized to access protected registers, communications circuitry, or restricted/protected sections of the modem framework, memory, or hardware. Privileges may be set based on execution patterns or sequences of operations, such as whether the software application is authorized to access and use the communication circuitry of the mobile device after reading a portion of the memory that stores credit card information, security keys, device IDs, etc.

In various aspects, the hardware debug module may include, or may be coupled to, a configuration and translation unit. The configuration and translation unit may be configured to identify key assets (e.g., memory ranges, etc.) that require monitoring based on a mobile device behavior or feature (e.g., camera, banking software, etc.). For example, the configuration and translation unit may be configured to receive information from the observer module that identifies a camera of the mobile device as requiring low level monitoring, use a memory map to identify the sections of memory that store information relating to the access or use of the important features of the camera, and communicate this information to the hardware debug module. The hardware debug module may then add the identified sections of memory to the list of key assets that require monitoring, and monitor the data bus for memory read or write operations to those sections of memory. In an aspect, the translation unit of the mobile device information may be configured to receive information identifying a component in the mobile device as a critical data resource, determining a section of memory that stores information for the identified component, and adding the determined section of memory to a key asset list stored in memory of the mobile device that is monitored by a behavioral monitoring and analysis module of the mobile device to detect malicious, suspicious or performance degrading behaviors as described herein.

In an aspect, the hardware debug module may include an application programming interface (API) that is suitable for sending and receiving input/output (I/O) instructions and information to and from the comprehensive behavioral monitoring and analysis system, third party applications, third party security enabling libraries, components in a protected, secured or trusted execution environment (e.g., ARM TrustZone®, etc.) of the mobile device, proprietary hardware modules, etc.

In an aspect, the configurable hardware component may be configured to receive triggers (e.g., trigger communication messages) that identify hardware and/or software events detected in various components in the mobile device. In an aspect, the configurable hardware component may be configured to generate triggers in response to detecting hardware and/or software events, such as the unauthorized access or use of a key asset of the mobile device.

The various aspects may be implemented in a number of different mobile devices, including single processor and multiprocessor systems, and a system-on-chip (SOC). FIG. 1 is an architectural diagram illustrating an example system-on-chip (SOC) 100 architecture that may be used in computing devices implementing the various aspects. The SOC 100 may include a number of heterogeneous processors, such as a digital signal processor (DSP) 101, a modem processor 104, a graphics processor 106, and an application processor 108. The SOC 100 may also include one or more coprocessors 110 (e.g., vector co-processor) connected to one or more of the heterogeneous processors 101, 104, 106, 108. Each processor 101, 104, 106, 108, 110 may include one or more cores, and each processor/core may perform operations independent of the other processors/cores. For example, the SOC 100 may include a processor that executes a first type of operating system (e.g., FreeBSD, LINIX, OS X, etc.) and a processor that executes a second type of operating system (e.g., Microsoft Windows 8).

The SOC 100 may also include analog circuitry and custom circuitry 114 for managing sensor data, analog-to-digital conversions, wireless data transmissions, and for performing other specialized operations, such as processing encoded audio signals for games and movies. The SOC 100 may further include system components and resources 116, such as voltage regulators, oscillators, phase-locked loops, peripheral bridges, data controllers, memory controllers, system controllers, access ports, timers, and other similar components used to support the processors and clients running on a computing device.

The system components 116 and custom circuitry 114 may include circuitry to interface with peripheral devices, such as cameras, electronic displays, wireless communication devices, external memory chips, etc. The processors 101, 104, 106, 108 may be interconnected to one or more memory elements 112, system components, and resources 116 and custom circuitry 114 via an interconnection/bus module 124, which may include an array of reconfigurable logic gates and/or implement a bus architecture (e.g., CoreConnect, AMBA, etc.). Communications may be provided by advanced interconnects, such as high performance networks-on chip (NoCs).

The SOC 100 may further include an input/output module (not illustrated) for communicating with resources external to the SOC, such as a clock 118 and a voltage regulator 120. Resources external to the SOC (e.g., clock 118, voltage regulator 120) may be shared by two or more of the internal SOC processors and/or cores (e.g., DSP 101, modem processor 104, graphics processor 106, applications processor 108, etc.).

The SOC 100 may also include hardware and/or software components suitable for collecting sensor data from sensors, including speakers, user interface elements (e.g., input buttons, touch screen display, etc.), microphone arrays, sensors for monitoring physical conditions (e.g., location, direction, motion, orientation, vibration, pressure, etc.), cameras, compasses, GPS receivers, communications circuitry (e.g., Bluetooth®, WLAN, WiFi, etc.), and other well known components (e.g., accelerometer, etc.) of modern electronic devices.

The SOC 100 may also include a configurable hardware debug and trace module 122. In an aspect, the configurable hardware debug and trace module 122 may be configured to monitor key assets (e.g., portions of the system memory 112, etc.) at a low level (e.g., at the kernel, firmware, hardware, or machine levels) to identify a suspicious or malicious activities, events, behaviors, software applications, or processes. The configurable hardware debug and trace module 122 may be configured to monitor the bus 124 to detect a suspicious activity, and report the detected activity to the various modules of the mobile device. In an aspect the configurable hardware debug and trace module 122 may be a hardware debug module that is conventionally used by the hardware or SOC developer for debugging operations but left inactive thereafter.

In an aspect, the processors 101, 104, 106, 108, 110 may be equipped with embedded logic gates that provide built-in debug and trace facilities that may be used by the configurable hardware debug and trace module 122 to perform various profiling, debug and trace operations. In an aspect, the configurable hardware debug and trace module 122 may be configured to monitor logic gates to collect instruction, trace, debug and data transfer information, compress this information and deliver the information, in real-time, to behavior monitoring and analysis of on the mobile device for post processing. Conventionally, this information from the hardware debug and trace module 122 is used for design testing and debugging during the development and test phase, but has no use in production modules. Thus, the hardware debug and trace module 122 is normally deactivated in mobile devices in normal use.

In the various aspects the configurable hardware debug and trace module 122 may be configured to capture information regarding a processor's execution (for example, step-by-step functioning in the processor) from the logic gates embedded in that processor for use during normal (i.e., non-debug) operations in monitoring for malicious behavior without having a significant or user-perceptible impact on the processor's performance.

In addition to the SOC 100 discussed above, the various aspects may be implemented in a wide variety of computing systems, which may include a single processor, multiple processors, multicore processors, or any combination thereof. In an aspect, the SOC 100 may be included in a mobile device.

Figure 2:
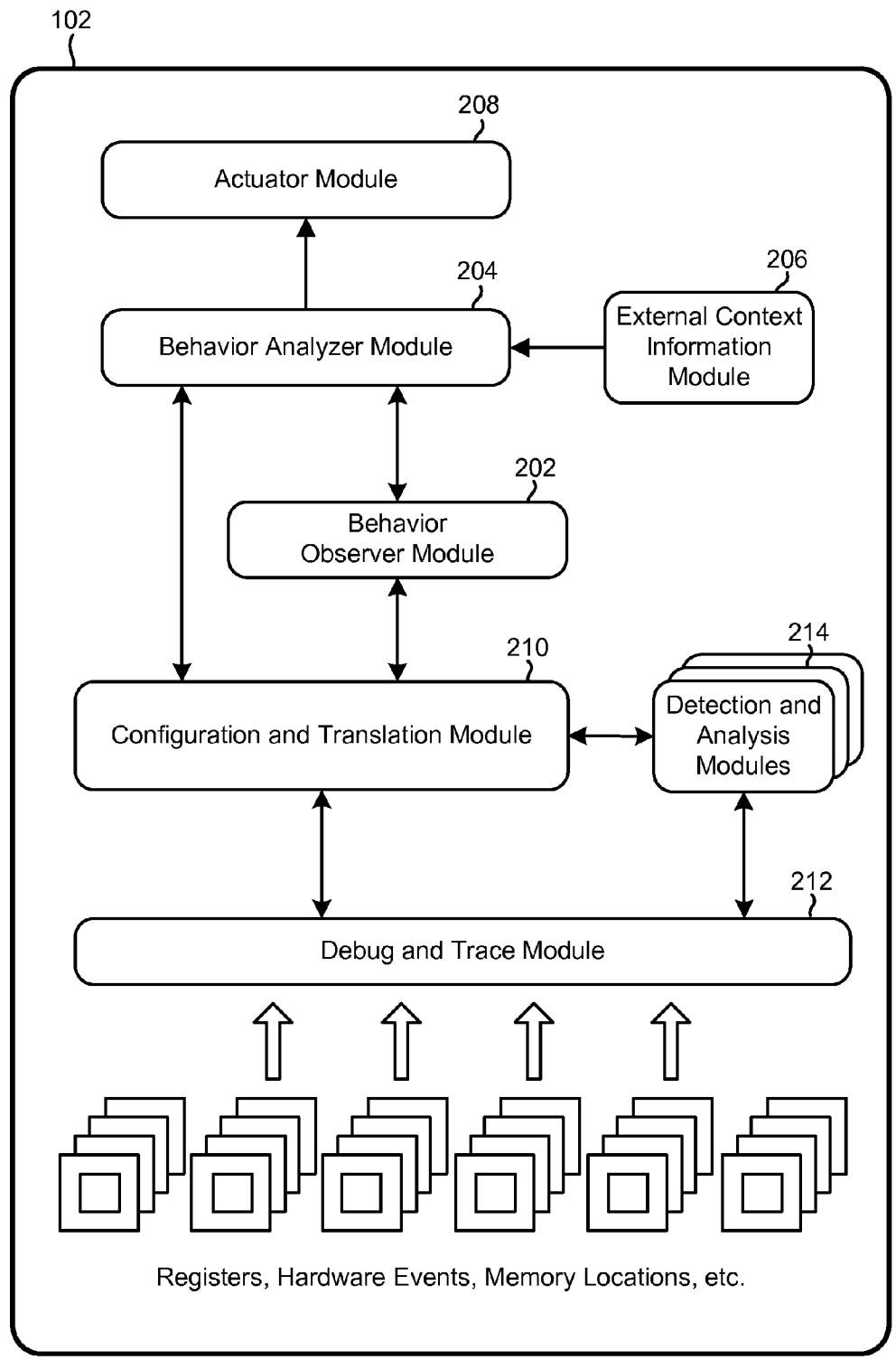
FIG. 2 is a block diagram illustrating example logical components and information flows in an aspect mobile device configured to monitor key assets to determine whether a particular mobile device behavior, software application, or process is malicious, performance-degrading, suspicious, or benign.

FIG. 2 illustrates example logical components and information flows in an aspect mobile device 102 configured to use information obtained from a hardware debug module to determine whether a particular mobile device behavior, software application, or process is malicious/performance-degrading, suspicious, or benign. In the example illustrated in FIG. 2, the mobile device 102 includes a behavior observer module 202, a behavior analyzer module 204, an external context information module 206, an actuator module 208, a configuration and translation module 210, and a debug and trace module 212. In an aspect, the mobile device may also include one or more detection and analysis modules 214, any or all of which may be configured to work in conjunction with the configuration and translation module 210 and the debug and trace module 212.

In an aspect, the behavior analyzer module 204 may include a classifier module (not illustrated) and/or one or more classifiers. In an aspect, the configuration and translation module 210 may be included in, or implemented as part of, the debug and trace module 212. In an aspect, the debug and trace module 212 may be configured to communicate with the configurable hardware debug and trace module 122 (illustrated in FIG. 1). In an aspect, the debug and trace module 212 may be the configurable hardware debug and trace module 122 (illustrated in FIG. 1).

Each of these modules 202-214 may be implemented in software, in hardware, or in a combination of software and hardware. For example, in an aspect, one or more of these modules 202-214 may be implemented as software instructions executing on one or more processors of the mobile device 102. In various aspects, these modules 202-214 may be implemented within parts of the operating system (e.g., within the kernel, in the kernel space, in the user space, etc.), within separate programs or applications, in specialized hardware buffers or processors, partially within a trust zone of a processor, or any combination thereof.

The behavior observer module 202 may be configured to instrument or coordinate application programming interfaces (APIs) at various levels/modules of the mobile device, and monitor/observe mobile device operations and events (e.g., system events, state changes, etc.) at the various levels/modules via the instrumented APIs, collect information pertaining to the observed operations/events, intelligently filter the collected information, generate one or more observations based on the filtered information, store the generated observations in a memory (e.g., in a log file, cache memory, etc.) and/or send (e.g., via memory writes, function calls, etc.) the generated observations to the behavior analyzer module 204. In various aspects, the generated observations may be stored as a behavior vector and/or in an API log file or data structure.

The behavior observer module 202 may monitor/observe mobile device operations and events by collecting information pertaining to library API calls in an application framework or run-time libraries, system call APIs, file-system and networking sub-system operations, device (including sensor devices) state changes, and other similar events. The behavior observer module 202 may also monitor file system activity, which may include searching for filenames, categories of file accesses (personal info or normal data files), creating or deleting files (e.g., type exe, zip, etc.), file read/write/seek operations, changing file permissions, etc.

The behavior observer module 202 may also monitor/observe data network activity, which may include types of connections, protocols, port numbers, server/client that the device is connected to, the number of connections, volume or frequency of communications, etc. The behavior observer module 202 may monitor phone network activity, which may include monitoring the type and number of calls or messages (e.g., SMS, etc.) sent out, received, or intercepted (e.g., the number of premium calls placed).

The behavior observer module 202 may also monitor/observe system resource usage, which may include monitoring the number of forks, memory access operations, number of files open, etc. The behavior observer module 202 may monitor the state of the mobile device, which may include monitoring various factors, such as whether the display is on or off, whether the device is locked or unlocked, the amount of battery remaining, the state of the camera, etc. The behavior observer module 202 may also monitor inter-process communications (IPC) by, for example, monitoring intents to crucial services (browser, contracts provider, etc.), the degree of inter-process communications, pop-up windows, etc.

The behavior observer module 202 may also monitor/observe driver statistics and/or the status of one or more hardware components, which may include cameras, sensors, electronic displays, WiFi communication components, data controllers, memory controllers, system controllers, access ports, timers, peripheral devices, wireless communication components, external memory chips, voltage regulators, oscillators, phase-locked loops, peripheral bridges, and other similar components used to support the processors and clients running on the mobile computing device.

The behavior observer module 202 may also monitor/observe one or more hardware counters that denote the state or status of the mobile computing device and/or mobile device sub-systems. A hardware counter may include a special-purpose register of the processors/cores that is configured to store a count value or state of hardware-related activities or events occurring in the mobile computing device.

The behavior observer module 202 may also monitor/observe actions or operations of software applications, software downloads from an application download server (e.g., Apple® App Store server), mobile device information used by software applications, call information, text messaging information (e.g., SendSMS, BlockSMS, ReadSMS, etc.), media messaging information (e.g., ReceiveMMS), user account information, location information, camera information, accelerometer information, browser information, content of browser-based communications, content of voice-based communications, short range radio communications (e.g., Bluetooth, WiFi, etc.), content of text-based communications, content of recorded audio files, phonebook or contact information, contacts lists, etc.

The behavior observer module 202 may also monitor/observe transmissions or communications of the mobile device, including communications that include voicemail (VoiceMailComm), device identifiers (DeviceIDComm), user account information (UserAccountComm), calendar information (CalendarComm), location information (LocationComm), recorded audio information (RecordAudioComm), accelerometer information (AccelerometerComm), etc.

The behavior observer module 202 may also monitor/observe usage of and updates/changes to compass information, mobile device settings, battery life, gyroscope information, pressure sensors, magnet sensors, screen activity, etc. The behavior observer module 202 may monitor/observe notifications communicated to and from a software application (AppNotifications), application updates, etc. The behavior observer module 202 may monitor/observe conditions or events pertaining to a first software application requesting the downloading and/or install of a second software application. The behavior observer module 202 may monitor/observe conditions or events pertaining to user verification, such as the entry of a password, etc.

The behavior observer module 202 may also monitor/observe conditions or events at multiple levels of the mobile device, including the application level, radio level, and sensor level. Application level observations may include observing the user via facial recognition software, observing social streams, observing notes entered by the user, observing events pertaining to the use of PassBook/Google Wallet/Paypal, etc. Application level observations may also include observing events relating to the use of virtual private networks (VPNs) and events pertaining to synchronization, voice searches, voice control (e.g., lock/unlock a phone by saying one word), language translators, the offloading of data for computations, video streaming, camera usage without user activity, microphone usage without user activity, etc.

Radio level observations may include determining the presence, existence or amount of any or more of: user interaction with the mobile device before establishing radio communication links or transmitting information, dual/multiple SIM cards, Internet radio, mobile phone tethering, offloading data for computations, device state communications, the use as a game controller or home controller, vehicle communications, mobile device synchronization, etc. Radio level observations may also include monitoring the use of radios (WiFi, WiMax, Bluetooth, etc.) for positioning, peer-to-peer (p2p) communications, synchronization, vehicle-to-vehicle communications, and/or machine-to-machine (m2m). Radio level observations may further include monitoring network traffic usage, statistics, or profiles.

Sensor level observations may include monitoring a magnet sensor or other sensor to determine the usage and/or external environment of the mobile device. For example, the mobile device processor may be configured to determine whether the phone is in a holster (e.g., via a magnet sensor configured to sense a magnet within the holster) or in the user's pocket (e.g., via the amount of light detected by a camera or light sensor). Detecting that the mobile device is in a holster may be relevant to recognizing suspicious behaviors, for example, because activities and functions related to active usage by a user (e.g., taking photographs or videos, sending messages, conducting a voice call, recording sounds, etc.) occurring while the mobile device is holstered could be signs of nefarious processes executing on the device (e.g., to track or spy on the user).

Other examples of sensor level observations related to usage or external environments include, detecting near-field communications (NFC), collecting information from a credit card scanner, barcode scanner, or mobile tag reader, detecting the presence of a USB power charging source, detecting that a keyboard or auxiliary device has been coupled to the mobile device, detecting that the mobile device has been coupled to a computing device (e.g., via USB, etc.), determining whether an LED, flash, flashlight, or light source has been modified or disabled (e.g., maliciously disabling an emergency signaling app, etc.), detecting that a speaker or microphone has been turned on or powered, detecting a charging or power event, detecting that the mobile device is being used as a game controller, etc. Sensor level observations may also include collecting information from medical or healthcare sensors or from scanning the user's body, collecting information from an external sensor plugged into the USB/audio jack, collecting information from a tactile or haptic sensor (e.g., via a vibrator interface, etc.), collecting information pertaining to the thermal state of the mobile device, etc.

The behavior observer module 202 may be configured to generate behavior vectors that include a concise definition of the observed behaviors. Each behavior vector may succinctly describe observed behavior of the mobile device, software application, or process in a value or vector data-structure (e.g., in the form of a string of numbers, etc.). A behavior vector may also function as an identifier that enables the mobile device system to quickly recognize, identify, and/or analyze mobile device behaviors. In an aspect, the behavior observer module 202 may generate a behavior vector that includes series of numbers, each of which signifies a feature or a behavior of the mobile device. For example, numbers included in the behavior vector may signify whether a camera of the mobile device is in use (e.g., as zero or one), how much network traffic has been transmitted from or generated by the mobile device (e.g., 20 KB/sec, etc.), how many internet messages have been communicated (e.g., number of SMS messages, etc.), etc.

To reduce the number of factors monitored to a manageable level, in an aspect, the behavior observer module 202 may be configured to perform coarse observations by monitoring/observing an initial set of behaviors or factors that are a small subset of all factors that could contribute to the mobile device's degradation. In various aspects, the behavior observer module 202 may receive the initial set of behaviors and/or factors from other mobile devices, a network server, or a component in a cloud service or network. In an aspect, the initial set of behaviors/factors may be specified in data/behavior models received from the other mobile device, network server or cloud service/network. In an aspect, the initial set of behaviors/factors may be specified in a reduced feature model (RFMs).

The behavior analyzer module 204 may receive the observations, behavior vectors, and/or collected behavior information from the behavior observer module 202, compare the received information (i.e., observations) with contextual information received from the external context information module 206, and identify subsystems, processes, and/or applications associated with the received observations that are contributing to (or are likely to contribute to) the device's degradation over time, or which may otherwise cause problems on the device.

In an aspect, the behavior analyzer module 204 may include intelligence for utilizing a limited set of information (i.e., coarse observations) to identify behaviors, processes, or programs that are contributing to—or are likely to contribute to—the device's degradation over time, or which may otherwise cause problems on the device. For example, the behavior analyzer module 204 may be configured to analyze information (e.g., in the form of observations) collected from various modules (e.g., the behavior observer module 202, external context information module 206, etc.), learn the normal operational behaviors of the mobile device, and generate one or more behavior vectors based the results of the comparisons. The behavior analyzer module 204 may send the generated behavior vectors to an actuator module, which may perform various operations to operations to heal, cure, isolate, or otherwise fix the identified problem.

The behavior analyzer module 204 may receive the behavior vectors and compare them to one or more behavior modules to determine whether a particular mobile device behavior, software application, or process is performance-degrading/malicious, benign, or suspicious. When it is determined that a behavior, software application, or process is malicious or performance-degrading, the behavior analyzer module 204 may notify the actuator module 208, which may perform various actions or operations to correct mobile device behaviors determined to be malicious or performance-degrading and/or perform operations to heal, cure, isolate, or otherwise fix the identified problem.

When the behavior analyzer module 204 determines that a behavior, software application, or process is suspicious, the analyzer module 204 may notify the behavior observer module 202, which may adjust the adjust the granularity of its observations (i.e., the level of detail at which mobile device behaviors are observed) and/or change the behaviors that are observed based on information received from the analyzer module 204 (e.g., results of the real-time analysis operations), generate or collect new or additional behavior information, and send the new/additional information to the behavior analyzer module 204 for further analysis/classification. Such feedback communications between the behavior observer module 202 and the analyzer module 204 enable the mobile device 102 to recursively increase the granularity of the observations (i.e., make finer or more detailed observations) or change the features/behaviors that are observed until a source of a suspicious or performance-degrading mobile device behavior is identified, until a processing or batter consumption threshold is reached, or until the mobile device processor determines that the source of the suspicious or performance-degrading mobile device behavior cannot be identified from further increases in observation granularity. Such feedback communication also enable the mobile device 102 to adjust or modify the data/behavior models locally in the mobile device without consuming an excessive amount of the mobile device's processing, memory, or energy resources.

Thus, the analyzer module 204 may be configured to receive the coarse observations from the observer module 202 and identify subsystems, processes, and/or applications associated with the received coarse observations that may potentially contribute to the mobile device's degradation. This may be achieved by, for example, the analyzer module 204 comparing the received information with contextual information received from the external context information module 206.

The analyzer module 204 may instruct the observer module 202 to perform or enable deeper logging/observations or final logging on the identified subsystems, processes or applications. The observer module 202 may perform deeper observations on the identified subsystems, processes or applications. The observer module 202 may send the results of the deeper observations to the analyzer module 204 for further (and deeper) analysis. These operations may be repeated until the source of a problem is identified or until it is determined that the identified subsystems, processes or applications are not likely to cause problems or degradation. The analyzer module 204 may then send the results of the analysis to the actuator module 208, which may receive the results and perform operations to heal, cure, isolate, or otherwise fix the identified problem.

The observer module 202 and the analyzer module 204 may provide, either individually or collectively, real-time behavior analysis of the computing system's behaviors to identify suspicious behavior from limited and coarse observations, to dynamically determine behaviors to observe in greater detail, and to dynamically determine the level of detail required for the observations. In this manner, the observer module 202 and the analyzer module 204 enable the computing system 200 to efficiently identify and prevent problems from occurring on mobile devices without requiring a large amount of processor, memory, or battery resources on the device.

In various aspects, the behavior observer module 202 and/or the behavior analyzer module 204 may be configured to analyze mobile device behaviors by identifying a critical data resource that requires close monitoring, identifying an intermediate resource associated with the critical data resource, monitoring API calls made by a software application when accessing the critical data resource and the intermediate resource, identifying mobile device resources that are consumed or produced by the API calls, identifying a pattern of API calls as being indicative of malicious activity by the software application, generating a light-weight behavior signature based on the identified pattern of API calls and the identified mobile device resources, using the light-weight behavior signature to perform behavior analysis operations, and determining whether the software application is malicious or benign based on the behavior analysis operations.

In various aspects, the behavior observer module 202 and/or the behavior analyzer module 204 may be configured to analyze mobile device behaviors by identifying APIs that are used most frequently by software applications executing on the mobile device, storing information regarding usage of identified APIs in an API log in a memory of the mobile device, and performing behavior analysis operations based on the information stored in the API log to identify mobile device behaviors that are inconsistent with normal operation patterns. In an aspect, the API log may be generated so that it is organized such that that the values of generic fields that remain the same across invocations of an API are stored in a separate table as the values of specific fields that are specific to each invocation of the API. The API log may also be generated so that the values of the specific fields are stored in a table along with hash keys to the separate table that stores the values of the generic fields.

In various aspects, the behavior observer module 202 and/or the behavior analyzer module 204 may use information on device operations and behaviors from a debug and trace module 212 configured to monitor key assets of a mobile computing device at a low level (e.g., at the kernel, firmware, hardware, or machine levels). As described in more detail below, the information provided to the observer module 202 and/or the behavior analyzer module 204 by the debug and trace module 212 may include information obtained from monitoring various device features at a low level (e.g., at the firmware, hardware, or machine levels).

In various aspects, the behavior observer module 202 and/or the behavior analyzer module 204 may be configured to receive a full classifier model that includes a finite state machine that is suitable for conversion or expression as a plurality of boosted decision stumps, generate a lean classifier model in the mobile device based on the full classifier, and use the lean classifier model in the mobile device to classify a behavior of the mobile device as being either benign or not benign (i.e., malicious, performance degrading, etc.). In an aspect, generating the lean classifier model based on the full classifier model may include determining a number of unique test conditions that should be evaluated to classify a mobile device behavior without consuming an excessive amount of processing, memory, or energy resources of the mobile device, generating a list of test conditions by sequentially traversing the list of boosted decision stumps and inserting the test condition associated with each sequentially traversed boosted decision stump into the list of test conditions until the list of test conditions may include the determined number of unique test conditions, and generating the lean classifier model to include only those boosted decision stumps that test one of a plurality of test conditions included in the generated list of test conditions.

In various aspects, the behavior observer module 202 and/or the behavior analyzer module 204 may be configured to use device-specific information of the mobile device to identify mobile device-specific test conditions in a plurality of test conditions that are relevant to classifying a behavior of the mobile device, generate a lean classifier model that includes only the identified mobile device-specific test conditions, and use the generated lean classifier model in the mobile device to classify the behavior of the mobile device. In an aspect, the lean classifier model may be generated to include only decision nodes that evaluate a mobile device feature that is relevant to a current operating state or configuration of the mobile device. In a further aspect, generating the lean classifier model may include determining a number of unique test conditions that should be evaluated to classify the behavior without consuming an excessive amount of mobile device's resources (e.g., processing, memory, or energy resources), generating a list of test conditions by sequentially traversing the plurality of test conditions in the full classifier model, inserting those test conditions that are relevant to classifying the behavior of the mobile device into the list of test conditions until the list of test conditions includes the determined number of unique test conditions, and generating the lean classifier model to include decision nodes included in the full classifier model that test one of the conditions included in the generated list of test conditions.

In various aspects, the behavior observer module 202 and/or the behavior analyzer module 204 may be configured to recognize mobile device behaviors that are inconsistent with normal operation patterns of the mobile device by monitoring an activity of a software application or process, determining an operating system execution state of the software application/process, and determining whether the activity is benign based on the activity and/or the operating system execution state of the software application or process during which the activity was monitored. In an further aspect, the behavior observer module 202 and/or the behavior analyzer module 204 may determine whether the operating system execution state of the software application or process is relevant to the activity, generate a shadow feature value that identifies the operating system execution state of the software application or process during which the activity was monitored, generate a behavior vector that associates the activity with the shadow feature value identifying the operating system execution state, and use the behavior vector to determine whether the activity is benign, suspicious, or not benign (i.e., malicious or performance-degrading).

In an aspect, the analyzer module 204 may be configured to perform real-time behavior analysis operations, which may include performing, executing, and/or applying data, algorithms, classifiers or behavior models (collectively "classifier models") to the collected behavior information. Each classifier model may be a behavior model that includes information that may be used by a mobile device processor to evaluate a specific aspect of a mobile device behavior. The classifier models may be preinstalled on the mobile device, downloaded, received from a network server, generated in the mobile device, or any combination thereof. A classifier model may be generated by using machine learning and other similar techniques. Each classifier model may be categorized as a full classifier model or a lean classifier model. A full classifier model may be a robust data model that is generated as a function of a large training dataset, which may include thousands of features and billions of entries. A lean classifier model may be a more focused data model that is generated from a reduced dataset that includes only the features/entries that are most relevant for determining whether a particular mobile device behavior is benign or not benign (e.g., malicious or performance-degrading).

Various aspects may include mobile devices and network servers configured to work in conjunction with one another to intelligently and efficiently identify the features, factors, and data points that are most relevant to determining whether a mobile device behavior is benign or not benign (e.g., malicious or performance-degrading). In various aspects, the network server may be configured to receive a large amount of information regarding mobile device behaviors and states, features, and conditions during or characterizing those behaviors from a cloud service/network. This information may be in the form of a very large cloud corpus of mobile device behavior vectors. The network server may use this information to generate a full classifier model (i.e., a robust data/behavior model) that accurately describes the very large cloud corpus of behavior vectors. The network server may generate the full classifier model to include all or most of the features, data points, and/or factors that could contribute to the degradation over time of any of a number of different mobile devices.

In an aspect, the network server may generate the full classifier model to include a finite state machine expression or representation, such as a decision node or family of decision nodes. This finite state machine expression or representation can be quickly and efficiently culled, modified or converted into lean classifier models that are suitable for use or execution in a mobile device through application of culling algorithms at the mobile device processor. The finite state machine expression or representation may be an information structure that includes test conditions, state information, state-transition rules, and other similar information. In an aspect, the finite state machine expression or representation may be an information structure that includes a large or robust family of decision nodes that each evaluate or test a condition, feature, factor, or aspect of a behavior of the mobile device.

The mobile device 102 may be configured to receive a full classifier model from the network server, and use the received full classifier model to generate lean classifier models (i.e., data/behavior models) locally in the mobile device. The mobile device may generate these local lean classifier models by culling a set of decision nodes included in the received full classifier model into to a subset of decision nodes that identify, test, evaluate and/or depend upon a reduced or limited number of different mobile device states, features, behaviors, or conditions. This culling of the full set of decision nodes may be accomplished by: selecting a decision node; identifying all other decision nodes that depend upon the same mobile device state, feature, behavior, or condition as the selected decision node (and thus can be applied based upon one determination result); including in the lean classifier model the selected and all identified other decision nodes that depend upon the same mobile device state, feature, behavior, or condition; and repeating the process for a reduced/limited number of selected decision nodes not already included in the lean classifier model. By repeating the process using different numbers of mobile device states, features, behaviors, or conditions that are tested, a family of lean classifier models may be generated with varying degrees of leanness determined by the number of states, features, behaviors, or conditions that are evaluated. In addition, each of these lean classifier models may test or evaluate some or all of the same features or conditions as another lean classifier model, but using different threshold values and/or different weights assigned to the importance of the test results, features, or conditions evaluated. As such, the process of generating or regenerating the lean classifier models may include re-computing the threshold values and/or weights associated with the decision nodes.

Since these lean classifier models include a reduced subset of states, features, behaviors, or conditions that must be tested (compared to the full classifier model), the observer and/or analyzer modules may use them to quickly and accurately determine whether a mobile device behavior is benign or contributing to the degradation in the performance of the mobile device without consuming an excessive amount of processing, memory, or energy resources of the mobile device. As noted above, the leanest of the family of lean classifier models (i.e., the lean classifier model based on the fewest number of test conditions) may be applied routinely until a behavior is encountered that the model cannot categorize as either benign or malicious (and therefore is categorized by the model as suspicious), at which time a more robust (i.e., less lean) lean classifier model may be applied in an attempt to categorize the behavior as either benign or malicious. The application of ever more robust lean classifier models within the family of generated lean classifier models may be applied until a definitive classification of the behavior is achieved. In this manner, the observer and/or analyzer modules can strike a balance between efficiency and accuracy by limiting the use of the most complete, but resource-intensive lean classifier models to those situations where a robust classifier model is needed to definitively classify a behavior.

In various aspects, the mobile device 102 may be configured to generate one or more lean classifier models by converting a finite state machine representation/expression into decision nodes, culling the full set of decision nodes included in the full classifier model to a subset or subsets of decision nodes that depend upon a limited number of different mobile device states, features, behaviors, or conditions, and using the subset or subsets of decision nodes to intelligently monitor, analyze and/or classify a mobile device behavior. The use of decision nodes allows the observer and/or analyzer modules to generate and apply lean data models without communicating with the cloud or a network to re-train the data, which significantly reduces the mobile device's dependence on the network server and the cloud. This eliminates the feedback communications between the mobile device and the network server, which further improves the performance and power consumption characteristics of the mobile device.

In various aspects, the mobile device 102 may be configured to communicate with a network server that includes an offline classifier and/or a real-time online classifier. The network server may be configured to generate or update the classifier models by performing, executing, and/or applying machine learning and/or context modeling techniques to behavior information and/or results of behavior analyses provided by many mobile devices. The network server may receive a large number of reports from many mobile devices and analyze, consolidate or otherwise turn such crowd-sourced information into useable information, particularly a lean data set or focused behavior models that can be used or accessed by all mobile devices. The network server may continuously reevaluate existing classifier models as new behavior/analysis reports are received from mobile devices, and/or generate new or updated models based on historical information (e.g., collected from prior executions, previous applications of behavior models, etc.), new information, machine learning, context modeling, and detected changes in the available information, mobile device states, environmental conditions, network conditions, mobile device performance, battery consumption levels, etc.

In an aspect, the mobile device 102 may also include a critical data resources module (not illustrated) that stores a list of data resources (e.g. address book, camera, etc.) that are susceptible to misuse and/or determined to require close monitoring. The mobile device 102 may be configured to dynamically update/change the list of critical data resources based on feedback from the behavior analyzer module, heuristics, machine learning, historical information, current usage, events or conditions detected in the mobile device, information received from a server, user configuration, and/or other similar criteria, factors, events, or conditions.

In aspect, the mobile device 102 may be configured to monitor API calls at various levels of the software stack that relate to a critical resource identified in the critical data resources module. This may be accomplished by collecting behavior information from instrumented components relating to the critical resources and/or by reading information from API logs generated by the critical resources. The mobile device 102 may store the API logs for these resources/operations in an API call behavioral log database in memory. The mobile device 102 may also identify additional resources that require monitoring, determine that the continued monitor of a critical resource is not likely to provide useful information, and add or remove resources to the list of data resources stored in the critical data resources module, accordingly.

In aspect, the mobile device 102 may be configured to compare and/or analyze information retrieved from the API call behavioral log database with behavioral specification models to identify suspicious sequences or patterns of API calls that are indicative of a malicious activity or behavior, to identify the operations that should be evaluated together as part of a single mobile device behavior, and/or to identify critical resources that require closer monitoring or scrutiny by the behavior analyzer module 204.

In an aspect, the mobile device 102 may be configured to generate concise and light-weight behavior signatures for each critical resource based on the result of the comparison and/or analysis operations, and send these light-weight behavior signatures to the behavior analyzer module 204 for analysis. The behavior analyzer module 204 may receive and use the light-weight behavior signatures to quickly and efficiently determine the sequences of operations that should be analyzed together as a single mobile device behavior and/or the mobile device behaviors that require additional, different, or deeper analysis. For example, the behavior analyzer module 204 may determine that all API calls relating a critical resource and its associated ghost resources logged in the past week should be analyzed together as a single mobile device behavior.

The configuration and translation module 210 may be configured to identify key assets (e.g., memory ranges, etc.) that require monitoring based on a mobile device behavior or feature (e.g., camera, banking software, etc.).

The configuration and translation module 210 may be configured to receive information from the behavior observer module 202 identifying a feature that requires low level monitoring, use a memory map to identify the sections of memory that store information relating to the access or use of the identified feature, and send information that identifies these sections as key assets to the debug and trace module 212. The debug and trace module 212 may then add the identified sections of memory to the list of key assets that require monitoring.

The debug and trace module 212 may be a hardware component that is configured to monitor key assets of a mobile computing device at a low level (e.g., at the kernel, firmware, hardware, or machine levels), and identify a suspicious or malicious activities, events, behaviors, software applications, or processes in the mobile device. The debug and trace module 212 may be configured to monitor memory locations or other key assets in any or all of the components, sub-systems and processing cores of the mobile device 102. In an aspect, the debug and trace module 212 may be configured to monitor a system bus (e.g., bus 124 illustrated in FIG. 1) to detect a variety of activities in a hardware module, and report detected activities to the behavior observer module 202, the behavior analyzer module 204, and/or actuator module 208 of the mobile device.

The debug and trace module 212 may be a unified standardized trace mechanism or component configured to trace any or all sources or components in the mobile device. In an aspect, the debug and trace module 212 may be a programmable and configurable hardware debug module.

As mentioned above, the debug and trace module 212 may include any of a variety of hardware and software technologies that enable real-time (or near real-time) collection of information relating to instruction executions, bus transactions, memory accesses, data transfers, processor operations, and other similar events, operations or conditions in the mobile device. The debug and trace module 212 may include trace hardware or software configured to trace the operations in the various chips, hardware blocks, systems, sub-systems, processors, cores, memories and other components of the mobile device 102. The debug and trace module 212 may be configured to capture instruction flows, instruction sequences, state information, rising-edge hardware events, and/or timing information from various mobile device components. The debug and trace module 212 may be configured to perform profiling, debugging, or tracing operations to generate debug or trace data, including hardware block trace data, processor trace data, software trace data, memory trace data, program flow trace data, data flow trace data, bus signaling trace data, USB trace data, etc. The debug and trace module 212 may be configured to store the generated trace data, behavior vectors and the results of its monitoring, detection or analysis operations in a system memory 112 (illustrated in FIG. 1), a BAM, ETB, etc.

The debug and trace module 212 may be configured to dynamically determine the mobile device assets (e.g., memory locations, ranges of memory addresses, device address, instruction queues, modules, registers, etc) that are key assets. The debug and trace module 212 may be configured to monitor the access, distribution, or use of the key assets by monitoring data flows, transactions, or operations in a system or data bus of the mobile device to identify suspicious mobile device activities.

The debug and trace module 212 may be configured to classify a section of the mobile device's memory that stores credit card information as a key asset (e.g., by adding a memory address range list of key assets), monitor a data bus to detect memory read operations that target that section of the memory, identify the software application that pushed the read operation onto the data bus, determine whether the software application is authorized to read information from that section of the memory, generate a behavior vector that identifies the suspicious software application, and send the generated behavior vector to the observer and/or analyzer modules for additional security or detailed analysis.

The debug and trace module 212 may be configured to monitor various device features at a low level (e.g., at the firmware, hardware, or machine levels), and to monitor an instruction queue to identify instruction sequences or instruction execution patterns that are associated with the monitored features. The debug and trace module 212 may then work in conjunction with other components or modules, such as the illustrated detection and analysis modules 214, in the mobile device 102 to compare identified sequences/patterns to known patterns of malicious activities, and determine whether an identified sequence/pattern is associated with a malicious activity based on the results of the comparison. The mobile device may then delete, terminate, purge, stop, or freeze sequences or patterns that are associated with a malicious activity. For example, the detection and analysis modules 214 may stop or prevent a software application from accessing or using a key asset of the mobile device until the behavior analyzer module 204 determines that the software application is benign.

As mentioned above, the debug and trace module 212 may be configured to protect mobile device resources at various logical and/or functional levels of the mobile device systems, such as at the application level, user level, kernel level, framework level, firmware level, hardware level, etc. The debug and trace module 212 may be configured to prevent access to information or key assets based on the privileges of a requesting software application. Example privileges include whether the software application is authorized to read credit card information, security keys, address book entries, or device IDs from a mobile device memory. Other example privileges include whether the software application is authorized to access protected registers, communications circuitry, or restricted/protected sections of the modem framework, memory, or hardware. Privileges may be set based on execution patterns or sequences of operations, such as whether the software application is authorized to access and use the communication circuitry of the mobile device after reading a portion of the memory that stores credit card information, security keys, device IDs, etc.

The debug and trace module 212 may include an application programming interface (API) that is suitable for sending and receiving input/output (I/O) instructions and information to and from the comprehensive behavioral monitoring and analysis system, third party applications, third party security enabling libraries, TrustZone® based security/secure applications, proprietary hardware modules, etc.

The debug and trace module 212 may be configured to receive triggers (e.g., trigger communication messages) that identify hardware and/or software events detected in on various components in the mobile device. The debug and trace module 212 may be configured to generate triggers in response to detecting hardware and/or software events, such as the unauthorized access or use of a key asset of the mobile device.

In various aspects, the mobile device may implement, actuate, store, and/or execute different modules or subsystems in different privilege/protection domains or in different portions of a secure computing environment or trusted execution environment (e.g., ARM TrustZone®, etc.), which allows the mobile device to provide a secure and efficient system for identifying and correcting problematic mobile device behaviors.

Figure 3:
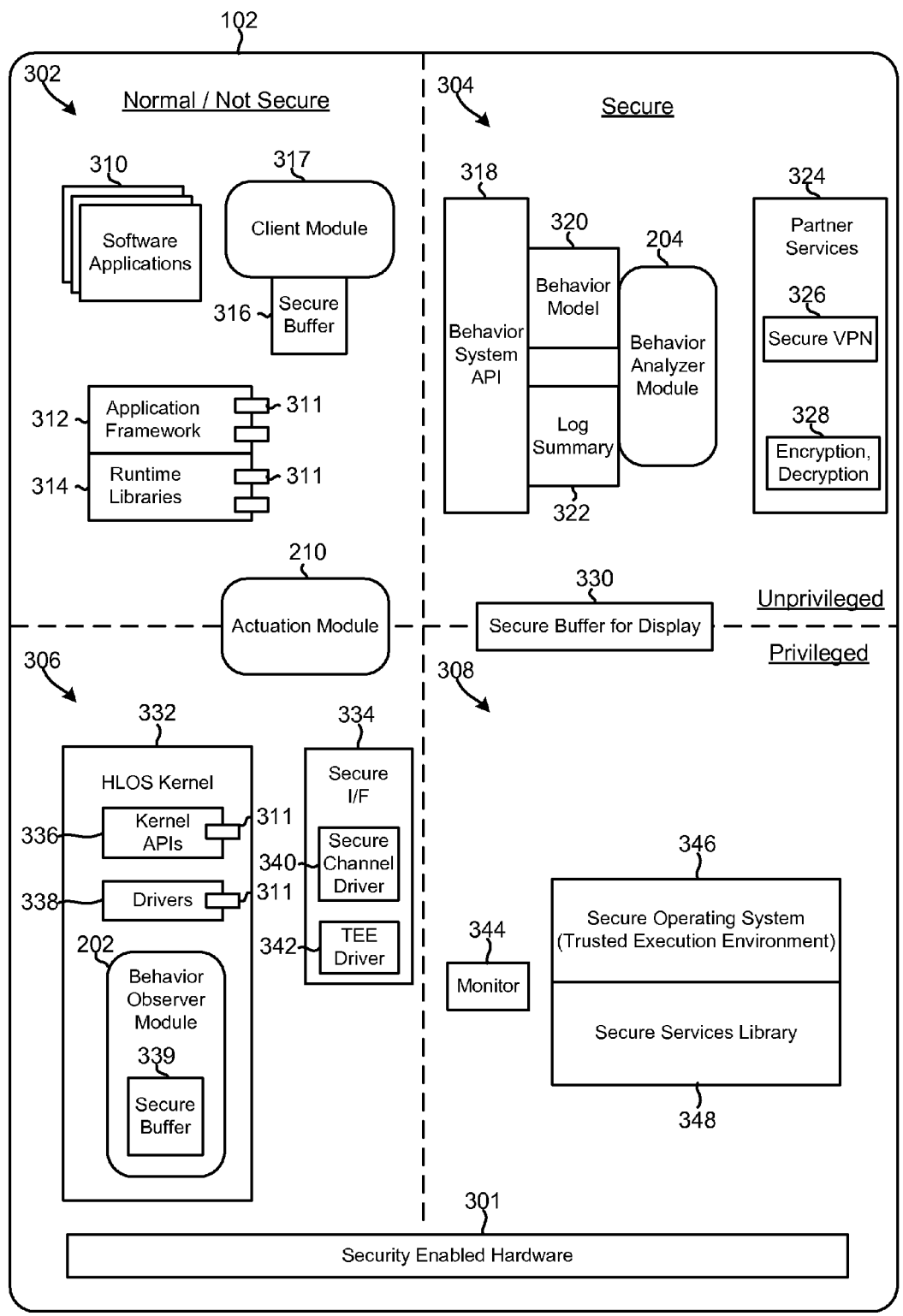
FIG. 3 is a block diagram illustrating additional example logical components and information flows in an aspect mobile device equipped with a secure computing environment having multiple privilege/protection domains that may be configured to monitor privileged or secured assets to securely determine whether a particular mobile device behavior, software application, or process is malicious, performance-degrading, suspicious, or benign.

FIG. 3 illustrates example logical components in an aspect mobile device configured to identify and correct problematic mobile device behaviors and balance tradeoffs between mobile device security, performance, and power efficiency. In the example illustrated in FIG. 3, the mobile device 102 includes a secure computing environment that includes security enabled hardware 301 and software divided into four protection domains/portions, namely an unprivileged-normal portion 302, an unprivileged-secure portion 304, a privileged-normal portion 306, and a privileged-secure portion 308. In various aspects, the security enabled hardware 301 may include a configurable hardware debug and trace module 122 (illustrated in FIG. 1), a configuration and translation module 210 (illustrated in FIG. 2), and/or a debug and trace module 212 (illustrated in FIG. 2).

Returning to FIG. 3, the unprivileged-normal portion 302 may include software applications 310, an application framework 312, runtime libraries 314, a secure buffer module 316, and a client module 317. In an aspect, the unprivileged-normal portion 302 may also include an actuation module 208. The secure buffer module 316 may be configured to enable communication between various logical components and across protection domains/portions. In an aspect, the secure buffer module 316 may be configured so that any module in any protection domain/portion 302-308 may write to its memory, but only modules in the secure portions 304, 308 may read the information stored in the memory. For example, the secure buffer module 316 may be configured so that the behavior observer module 202, the behavior analyzer module 204, and the partner services module 324 may write to its memory, but only the behavior analyzer module 204 and the partner services module 324 may read from its memory.

The unprivileged-secure portion 304 may include a behavior system API module 318, a behavior model module 320, a log summary module 322, and a behavior analyzer module 204. In an aspect, the unprivileged-secure portion 304 may further include a partner services module 324 that includes a secure virtual private network (VPN) module 324 and an encryption/decryption module 328. In an aspect, the unprivileged-secure portion 304 may also include a secure buffer for display 330, which may be suitable for communicating security-encrypted information generated in the unprivileged-secure portion 304 to an electronic display or display subsystem of the computing device. In an aspect, the unprivileged-secure portion 304 may be configured so that buffer control may be transferred directly to the display subsystem (not illustrated).

The privileged-normal portion 306 may include a high level operating system (HLOS) kernel 332 and secure infrastructure 334. The HLOS kernel 332 may include a kernel API module 336, a drivers module 338, and a behavior observer module 202, which may include a secure buffer 339. The secure infrastructure 334 may include a secure channel driver module 340 and a secure operating system or trusted execution environment driver module 342. In an aspect, the privileged-normal portion 306 may also include an actuation module 208. In an aspect, the secure buffer 339 may include or share a memory with the secure buffer 316.

The privileged-secure portion 308 may include a monitor module 344, a secure block system or trusted execution environment module 346, and a secure services library module 348. In an aspect, the privileged-secure portion 308 may also include a secure buffer for display 330.

In an aspect, the mobile device 102 may further include a secure file system (not illustrated) suitable for long term and secured storage of data and behavior models. In an aspect, the secure file system may be configured to store longer term data in encrypted form. In an aspect, the secure file system may be configured to store behavior models that are updated infrequently.

In an aspect, the mobile device 102 may further include a communication link suitable for communicating with a network server and/or a component in a cloud service or network. The communication link may be configured to support sending and receiving behavior models to and from an external server, which may be achieved in the unprivileged-secure portion 304 via the partner services module 324. For example, the secure VPN module 326 may receive encrypted behavior models from a network server, the encryption/decryption module 328 may decrypt the received behavior models in the unprivileged-secure portion 304 and provide the decrypted behavior models to the client module 317 in the unprivileged-normal portion 302.

The application framework 312, runtime libraries 314, kernel APIs 336, and drivers module 338 may each include an instrumented API 311, which may be used by the behavior observer module 202 to collect behavior information from each respective module 312, 314, 336, 338. Further, since these module 312, 314, 338, and 202 are situated in the normal portions of the secure system, behavior information may be sent from components in the unprivileged-normal portion 302 to the behavior observer module 202 in the privileged-normal portion 306 with minimal latency and without consuming a significant amount of the processing and battery resources of the mobile device. In addition, by situating the behavior observer module 202 in the privileged-normal portion 306 (as opposed to the unprivileged portion 302), the behavior observer module 202 is protected from unauthorized access by user-level software applications 310, which may be malicious, buggy or otherwise contribute to the performance degradation of the mobile device.

In an aspect, the security enabled hardware 301 may include a debug and trace module 212 (illustrated in FIG. 2) configured to monitor the instrumented APIs 311 and communicate the collected behavior information across the various privilege and protection domains 302, 304, 306, 308.

Figure 4:
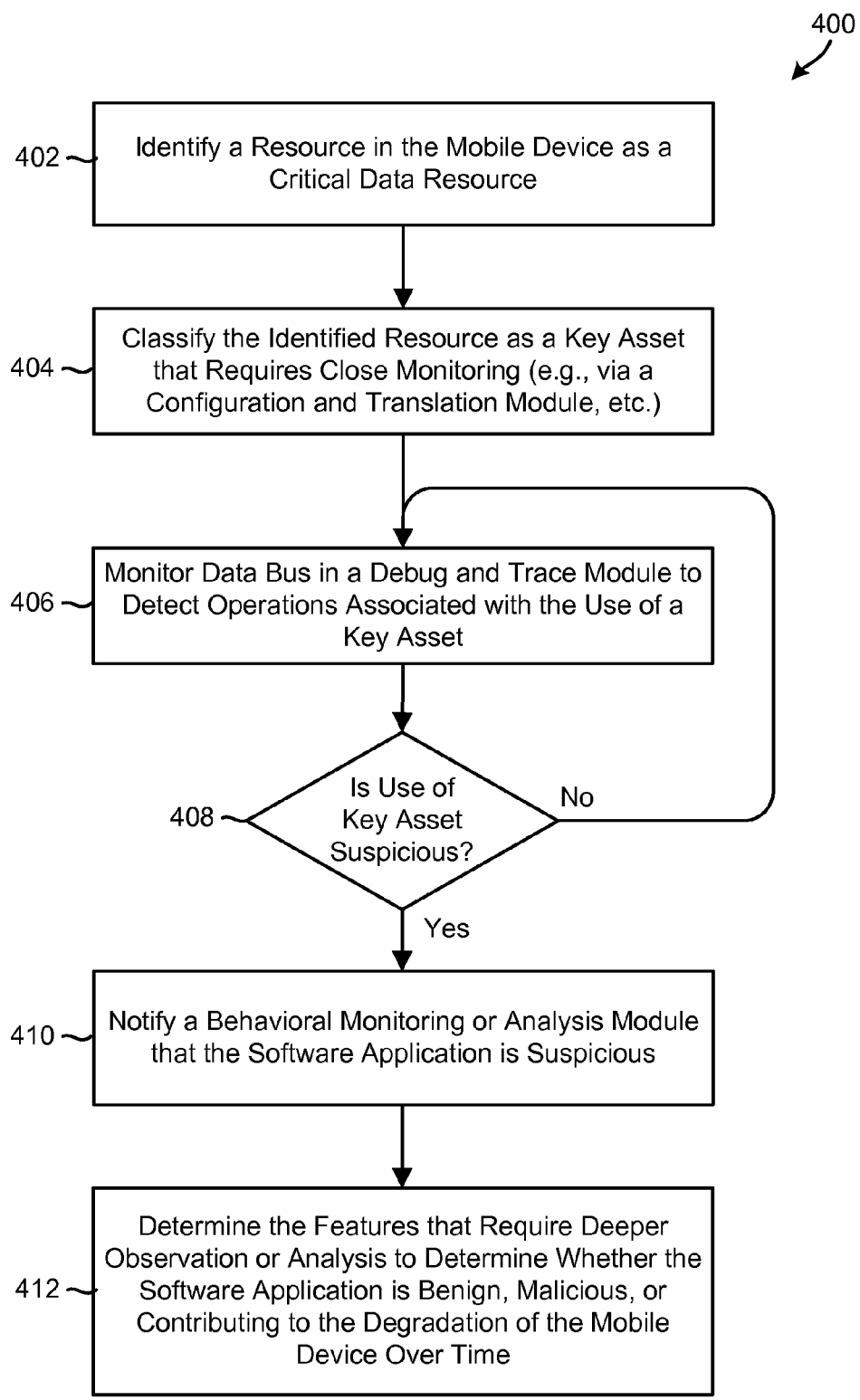
FIG. 4 is a process flow diagram illustrating an aspect method of monitoring the access or use of key assets in hardware to determine whether a particular software application is malicious or benign so as to prevent malicious software applications from avoiding detection.

FIG. 4 illustrates an aspect method 400 of monitoring key assets of the mobile device at a low level (e.g., firmware level, hardware level, etc.) as part of a comprehensive behavioral monitoring and analysis solution. Method 400 may be performed by hardware components in a mobile device, a processing core of the mobile device, or a combination thereof. In block 402, the mobile device may identify a resource in the mobile device that is a critical data resource. The resource may be any component associated with any behavior, operation, condition, or event that may be observed by the behavior analyzer module 204 (illustrated in FIG. 2). In various aspects, the mobile device may dynamically determine (or intelligently select) the assets that are to be monitored in the mobile device based on information received from the behavior observer module 202, the behavior analyzer module 204, the operating states or conditions in the mobile device, etc.

In block 404, the mobile device may classify the identified resource as a key asset that requires close monitoring. For example, the mobile device may receive information identifying a component in the mobile device as the critical data resource in its configuration and translation module 210. The configuration and translation module 210 may use this information to determine the sections of memory that store information for that component, and insert those sections in key asset list stored in the memory of the mobile device. That is, as part of block 404, the configuration and translation module 210 may receive information suitable for identifying a component in the mobile device as the critical data resource and/or for identifying the key assets that are to be monitored from the behavioral monitoring and analysis system, and use this information to intelligently determine the key assets that are to be monitored.

In block 406, the mobile device may monitor a data bus to detect data flows, API calls, transactions, or operations associated with the access, use, production, generation, or consumption of a key asset. In an aspect, the mobile device may monitor the data bus via a debug and trace module 212. The debug and trace module 212 may be a conventional hardware debug component or any configurable or programmable hardware component that may configured to monitor a data bus to detect and report the presence or existence of a specific event or condition.

In determination block 408, the mobile device may determine whether a detected access, use, production, generation, or consumption of the key asset by the software application is authorized or indicative of a suspicious activity. In an aspect, this may be accomplished by evaluating the characteristics or privileges of the requesting software application. For example, the mobile device may determine whether the software application is authorized to access or use communication circuitry of the mobile device after reading credit card information, security keys, address book entries, or device IDs from a mobile device memory.

If the mobile device determines that the access, use, production, generation, or consumption of the key asset is not indicative of a suspicious activity (i.e., determination block 408="No"), the mobile device may continue to monitor the data bus in block 406. Such key assets may include memory blocks, memory locations, ranges of memory addresses, device addresses, instruction queues, hardware blocks, hardware modules, registers, etc. in the mobile device that are associated with a feature, application or component of the mobile device that is susceptible to abuse. When the mobile device determines that the access, use, production, generation, or consumption of the key asset is indicative of a suspicious activity (i.e., determination block 408="Yes"), in block 410, the mobile device may notify a behavioral monitoring or analysis module of the mobile device that the access or use of the key asset by software application is suspicious. Notifying the behavioral monitoring and analysis module may include communicating (e.g., via a notification message, system call, trigger, memory write operation, etc.) an identifier of the software application and trace data to the behavior observer module 202, behavior analyzer module 204, or both.

In various aspect, as part of block 410, the mobile device may provide information obtained by the hardware component regarding API calls made by the software application to a behavioral monitoring and analysis module operating in the processor of the mobile device, which may used this information to determine whether the access or use of the key asset by the software application is suspicious. The behavioral monitoring and analysis module may determine if the use of the key asset by the software application is suspicious based at least in part on the information obtained by the hardware component.

Also as part of block 410, the mobile device may also monitor an instruction queue to identify an instruction sequence associated with the key asset, determine whether an identified instruction sequence is associated with a malicious activity by comparing the identified instruction sequence to known patterns of malicious activities, and delete, terminate, purge, stop, or freeze or remove the identified instruction sequence from the instruction queue. That is, in block 410, the mobile device may stop or prevent a software application from accessing or using a key asset of the mobile device until the analyzer module determines that the software application is benign.

In an aspect, the operations in blocks 404 and 410 may be performed without the operations in blocks 402, 406 and 408. Thus in this aspect, in block 404 a translation unit may receive information identifying a component in the mobile device as a critical data resource, determine a section of memory that stores information for the identified component, and add the determined section of memory to a key asset list stored in memory that is monitored in block 410 (e.g., by a behavioral monitoring and analysis module of the mobile device) to detect malicious, suspicious or performance degrading behaviors.

In block 412, the mobile device may use the information included in the notification generated in block 410 to determine the features that require deeper observation or analysis, or to quickly determine whether the software application is benign, malicious, or contributing to the degradation of the mobile device over time. For example, the mobile device may use the information to identify additional features associated with the identified software application that require monitoring, to identify the features that require additional or deeper analysis, or to otherwise identify and prevent problems from occurring on mobile devices. As part of these operations, the mobile device may identify a pattern of API calls as being indicative of malicious activity by the software application, generate a light-weight behavior vector or signature based on the identified pattern of API calls and the identified mobile device resources, and use the light-weight behavior signature to perform behavior analysis operations. In an aspect, using the light-weight behavior signature to perform behavior analysis operations may include performing, executing, and/or applying classifier models to collected behavior information to determine whether the software application is benign or malicious.

The various aspects may provide cross-layer observations on mobile devices encompassing webkit, SDK, NDK, kernel, drivers, and hardware in order to characterize system behavior. The behavior observations may be made in real time.

The observer module may perform adaptive observation techniques and control the observation granularity. As discussed above, there are a large number (i.e., thousands) of factors that could contribute to the mobile device's degradation, and it may not be feasible to monitor/observe all of the different factors that may contribute to the degradation of the device's performance. To overcome this, the various aspects dynamically identify the relevant behaviors that are to be observed, and dynamically determine the level of detail at which the identified behaviors are to be observed.

Figure 5:
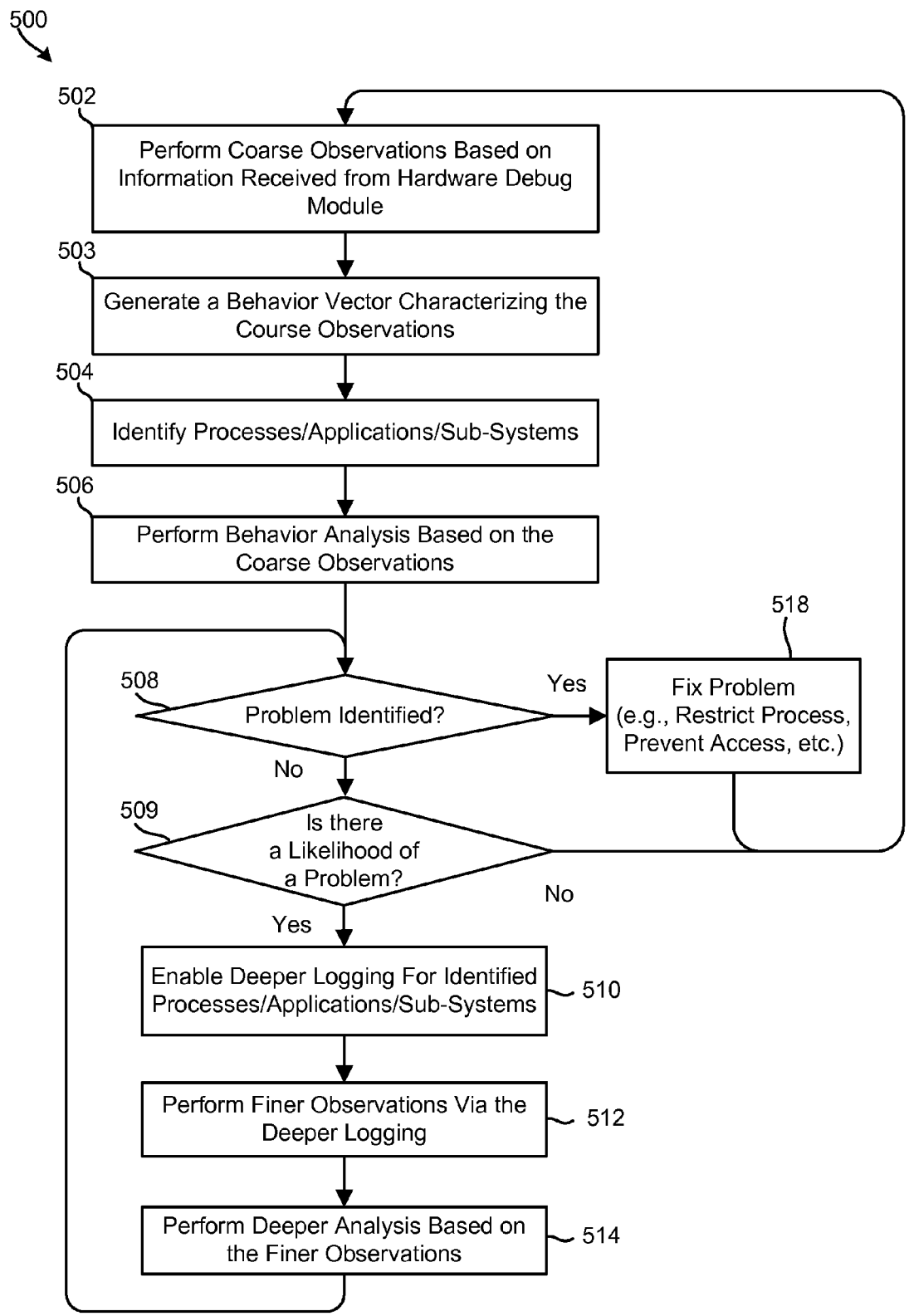
FIG. 5 is a process flow diagram illustrating an aspect method for performing adaptive observations on mobile devices.

FIG. 5 illustrates an example method 500 for performing dynamic and adaptive observations in accordance with an aspect. In block 502, the mobile device processor may perform coarse observations by monitoring/observing a subset of large number factors/behaviors that could contribute to the mobile device's degradation. In an aspect, the mobile device processor may perform coarse observations based on information collected from monitoring a data bus in a configurable hardware component, such as in the debug and trace module 212 illustrated in FIG. 2. In block 503, the mobile device processor may generate a behavior vector characterizing the coarse observations and/or the mobile device behavior based on the coarse observations. In block 504, the mobile device processor may identify subsystems, processes, and/or applications associated with the coarse observations that may potentially contribute to the mobile device's degradation. This may be achieved, for example, by comparing information received from multiple sources with contextual information received from sensors of the mobile device. In block 506, the mobile device processor may perform behavioral analysis operations based on the coarse observations. In determination block 508, the mobile device processor may determine whether suspicious behaviors or potential problems can be identified and corrected based on the results of the behavioral analysis. When the mobile device processor determines that the suspicious behaviors or potential problems can be identified and corrected based on the results of the behavioral analysis (i.e., determination block 508="Yes"), in block 518, the processor may initiate a process to correct the behavior and return to block 502 to perform additional coarse observations.

When the mobile device processor determines that the suspicious behaviors or potential problems can not be identified and/or corrected based on the results of the behavioral analysis (i.e., determination block 508="No"), in determination block 509 the mobile device processor may determine whether there is a likelihood of a problem. In an aspect, the mobile device processor may determine that there is a likelihood of a problem by computing a probability of the mobile device encountering potential problems and/or engaging in suspicious behaviors, and determining whether the computed probability is greater than a predetermined threshold. When the mobile device processor determines that the computed probability is not greater than the predetermined threshold and/or there is not a likelihood that suspicious behaviors or potential problems exist and/or are detectable (i.e., determination block 509="No"), the processor may return to block 502 to perform additional coarse observations.

When the mobile device processor determines that there is a likelihood that suspicious behaviors or potential problems exist and/or are detectable (i.e., determination block 509="Yes"), in block 510, the mobile device processor may perform deeper logging/observations or final logging on the identified subsystems, processes or applications. In block 512, the mobile device processor may perform deeper and more detailed observations on the identified subsystems, processes or applications. In block 514, the mobile device processor may perform further and/or deeper behavioral analysis based on the deeper and more detailed observations. In determination block 508, the mobile device processor may again determine whether the suspicious behaviors or potential problems can be identified and corrected based on the results of the deeper behavioral analysis. When the mobile device processor determines that the suspicious behaviors or potential problems can not be identified and corrected based on the results of the deeper behavioral analysis (i.e., determination block 508="No"), the processor may repeat the operations in blocks 510-514 until the level of detail is fine enough to identify the problem or until it is determined that the problem cannot be identified with additional detail or that no problem exists.

When the mobile device processor determines that the suspicious behaviors or potential problems can be identified and corrected based on the results of the deeper behavioral analysis (i.e., determination block 508="Yes"), in block 518, the mobile device processor may perform operations to correct the problem/behavior, and the processor may return to block 502 to perform additional operations.

In an aspect, as part of blocks 502-518 of method 500, the mobile device processor may perform real-time behavior analysis of the system's behaviors to identify suspicious behavior from limited and coarse observations, to dynamically determine the behaviors to observe in greater detail, and to dynamically determine the precise level of detail required for the observations. This enables the mobile device processor to efficiently identify and prevent problems from occurring, without requiring the use of a large amount of processor, memory, or battery resources on the device.

Figure 6:
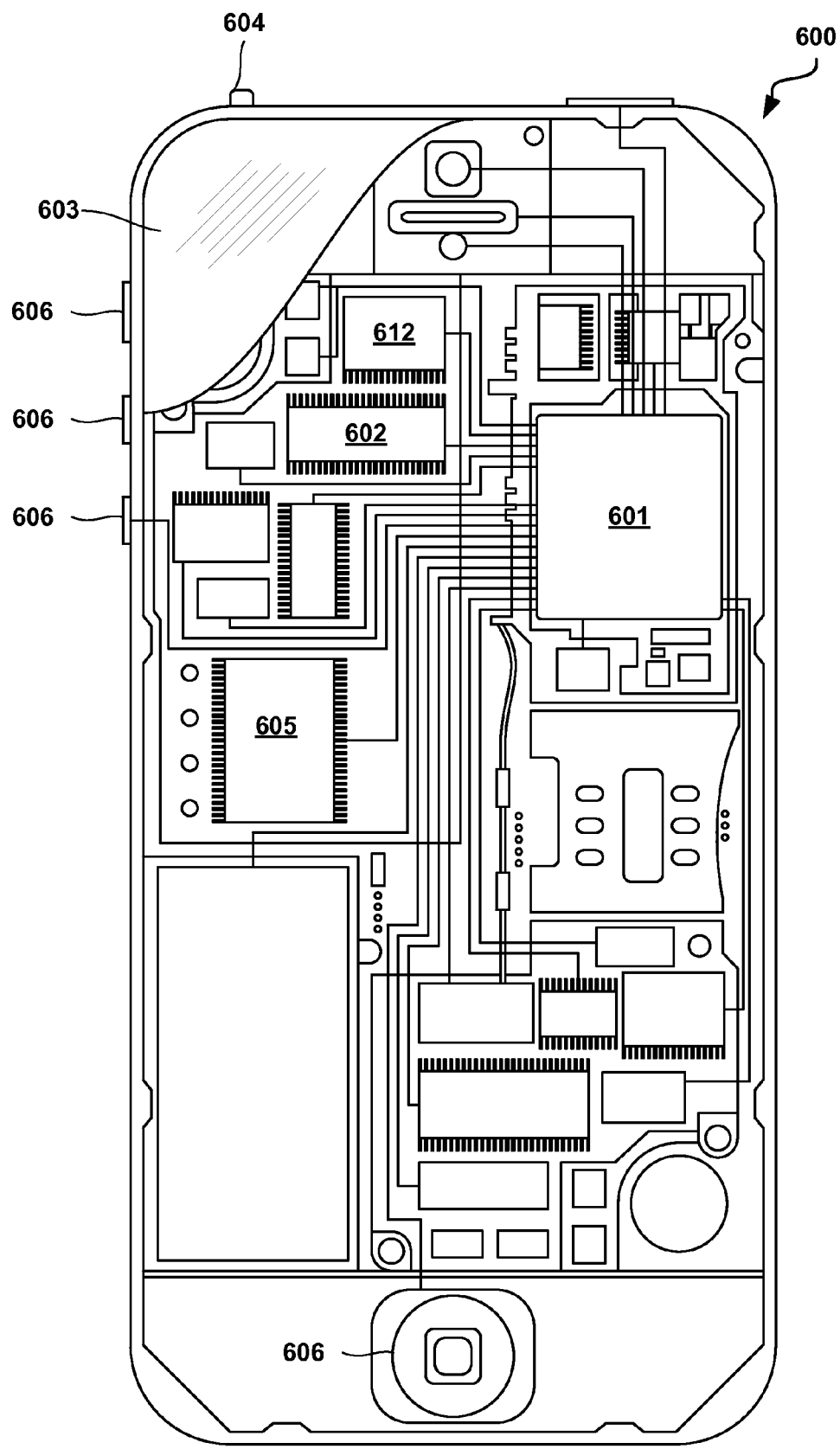
FIG. 6 is an illustration of an example mobile device suitable for use with the various aspects.

The various aspects may be implemented on a variety of mobile computing devices, an example of which is illustrated in FIG. 6 in the form of a smartphone. A smartphone 600 may include a processor 601 coupled to internal memory 602, a display 603, and to a speaker. Additionally, the smartphone 600 may include an antenna 604 for sending and receiving electromagnetic radiation that may be connected to a wireless data link and/or cellular telephone transceiver 605 coupled to the processor 601. Smartphones 600 typically also include menu selection buttons or rocker switches 606 for receiving user inputs.

A typical smartphone 600 also includes a sound encoding/decoding (CODEC) circuit 612, which digitizes sound received from a microphone into data packets suitable for wireless transmission and decodes received sound data packets to generate analog signals that are provided to the speaker to generate sound. Also, one or more of the processor 601, wireless transceiver 605 and CODEC circuit 612 may include a digital signal processor (DSP) circuit (not shown separately).

Figure 7:
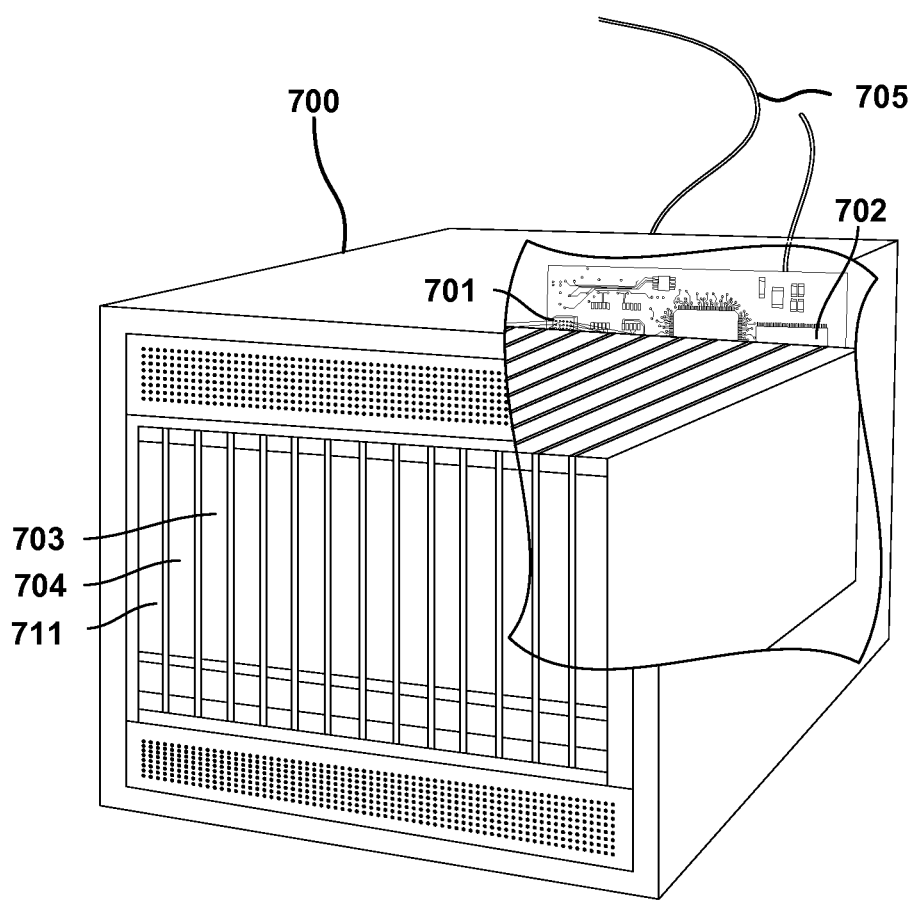
FIG. 7 is an illustration of an example server computer suitable for use with the various aspects.

Portions of the aspect methods may be accomplished in a client-server architecture with some of the processing occurring in a server, such as maintaining databases of action patterns and normal operational behaviors, which may be accessed by a mobile device processor while executing the aspect methods. Such aspects may be implemented on any of a variety of commercially available server devices, such as the server 700 illustrated in FIG. 7. Such a server 700 typically includes a processor 701 coupled to volatile memory 702 and a large capacity nonvolatile memory, such as a disk drive 703. The server 700 may also include a floppy disc drive, compact disc (CD) or DVD disc drive 711 coupled to the processor 701. The server 700 may also include network access ports 704 coupled to the processor 701 for establishing data connections with a network 705, such as a local area network coupled to other broadcast system computers and servers.

The processors 601, 701 may be any programmable microprocessor, microcomputer or multiple processor chip or chips that can be configured by software instructions (applications) to perform a variety of functions, including the functions of the various aspects described below. In some mobile devices, multiple processors 601 may be provided, such as one processor dedicated to wireless communication functions and one processor dedicated to running other applications. Typically, software applications may be stored in the internal memory 602, 702, 703 before they are accessed and loaded into the processor 601, 701. The processor 601, 701 may include internal memory sufficient to store the application software instructions.

Computer program code or "program code" for execution on a programmable processor for carrying out operations of the various aspects may be written in a high level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used herein to refer to machine language code (such as object code) whose format is understandable by a processor.

Many mobile computing devices operating system kernels are organized into a user space (where non-privileged code runs) and a kernel space (where privileged code runs). This separation is of particular importance in Android® and other general public license (GPL) environments where code that is part of the kernel space must be GPL licensed, while code running in the user-space may not be GPL licensed. It should be understood that the various software components/modules discussed here may be implemented in either the kernel space or the user space, unless expressly stated otherwise.

The term "system-on-chip" (SOC) is used in this application to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "multicore processor" is used in this application to refer to a single integrated circuit (IC) chip or chip package that contains two or more independent processing cores (e.g., CPU cores) configured to read and execute program instructions. A SOC may include multiple multicore processors, and each processor in an SOC may be referred to as a core. The term "multiprocessor" is used in this application to refer to a system or device that includes two or more processing units configured to read and execute program instructions.

As used in this application, the terms "component," "module," "system," "engine," "generator," "manager" and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

The foregoing method descriptions and the process flow diagrams are provided merely as illustrative examples and are not intended to require or imply that the steps of the various aspects must be performed in the order presented. As will be appreciated by one of skill in the art the order of steps in the foregoing aspects may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a multiprocessor, but, in the alternative, the processor may be any conventional processor, controller, microcontroller, or state machine. A processor may also be implemented as a combination of computing devices, e.g., a combination of a DSP and a multiprocessor, a plurality of multiprocessors, one or more multiprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed aspects is provided to enable any person skilled in the art to make or use the present invention. Various modifications to these aspects will be readily apparent to those skilled in the art, and the generic principles defined herein may be applied to other aspects without departing from the spirit or scope of the invention. Thus, the present invention is not intended to be limited to the aspects shown herein but is to be accorded the widest scope consistent with the following claims and the principles and novel features disclosed herein.

What is claimed is:

1. A method of analyzing mobile device behaviors, comprising:
   monitoring by a processor of a mobile device the mobile device behaviors to collect behavior information;
   generating a behavior vector using the collected behavior information;
   applying the generated behavior vector to a classifier model to generate an analysis result;
   determining whether a resource in the mobile device is susceptible to misuse based on the generated analysis result;
   determining in a hardware component of the mobile device whether the resource is a key asset that requires close monitoring in response to determining that the resource is susceptible to misuse based on the generated analysis result;
   monitoring in the hardware component the access or use of the resource by a software application to obtain low level behavior information in response to determining that the resource is a key asset that requires close monitoring;
   providing the obtained low level behavior information from the hardware component to a behavioral monitoring and analysis system of the mobile device; and
   determining in the behavioral monitoring and analysis system whether the software application is suspicious based on the low level behavior information.

2. The method of claim 1, wherein providing the obtained low level behavior information from the hardware component to the behavioral monitoring and analysis system comprises:
   determining in the hardware component whether the access or use of the resource by the software application is suspicious; and
   notifying the behavioral monitoring and analysis system of the mobile device that the access or use of the resource by the software application is suspicious.

3. The method of claim 1, wherein monitoring in the hardware component the access or use of the resource by the software application to obtain the low level behavior information comprises monitoring a data bus in a configurable hardware debug component to detect an application programming interface (API) call issued by the software application.

4. The method of claim 1, wherein determining whether the resource is the key asset comprises:
   receiving in a translation unit of the mobile device information identifying a component in the mobile device as a critical data resource;
   determining in the translation unit a section of memory that stores information for the component; and
   adding the determined section of memory to a key asset list stored in a memory of the mobile device.

5. The method of claim 1, further comprising:
   monitoring an instruction queue to identify an instruction sequence associated with the resource;
   determining whether an identified instruction sequence is associated with a malicious activity by comparing the identified instruction sequence to known patterns of malicious activities; and
   removing the identified instruction sequence from the instruction queue in response to determining that the identified instruction sequence is associated with the malicious activity.

6. The method of claim 1, wherein determining whether the resource is the key asset comprises determining whether the resource is an asset selected from a group comprising:
   a memory block;
   a memory address;
   a memory addresses range;
   a device address;
   a register; and
   a hardware block.

7. The method of claim 1, further comprising:
   identifying in the behavioral monitoring and analysis system a pattern of application programming interface (API) calls as being indicative of malicious activity by the software application in response to determining that the software application is suspicious;
   generating a light-weight behavior signature based on the identified pattern of API calls;
   using the light-weight behavior signature to perform behavior analysis operations; and
   determining whether the software application is malicious or benign based on the behavior analysis operations.

8. The method of claim 2, wherein notifying the behavioral monitoring and analysis system comprises communicating an identifier of the software application and trace data to one of an observer daemon and an analyzer daemon operating in the processor of the mobile device.

9. The method of claim 8, further comprising:
   identifying the mobile device behaviors that require deeper analysis based on information included in the identifier and trace data.

10. A mobile device, comprising:
    a hardware component;
    a processor coupled to the hardware component, wherein the processor is configured with processor-executable instructions to perform operations comprising:
      monitoring by a processor of a mobile device the mobile device behaviors to collect behavior information;
      generating a behavior vector using the collected behavior information;
      applying the generated behavior vector to a classifier model to generate an analysis result;
      determining whether a resource in the mobile device is susceptible to misuse based on the generated analysis result;
      determining via the hardware component whether the resource is a key asset that requires close monitoring in response to determining that the resource is susceptible to misuse based on the generated analysis result;
      monitoring via the hardware component the access or use of the resource by a software application to obtain low level behavior information in response to determining that the resource is a key asset that requires close monitoring;
      providing the obtained low level behavior information to a behavioral monitoring and analysis system of the mobile device; and
      determining via the behavioral monitoring and analysis system whether the software application is suspicious based on the low level behavior information.

11. The mobile device of claim 10, wherein the processor is configured with processor-executable instructions to perform operations such that providing the obtained low level behavior information to the behavioral monitoring and analysis system of the mobile device comprises:
    determining in the hardware component whether the access or use of the resource by the software application is suspicious; and notifying the behavioral monitoring and analysis system that the access or use of the resource by the software application is suspicious.

12. The mobile device of claim 10, wherein the processor is configured with processor-executable instructions to perform operations such that monitoring the access or use of the resource by the software application to obtain the low level behavior information comprises monitoring a data bus via a configurable hardware debug component to detect an application programming interface (API) call issued by the software application.

13. The mobile device of claim 10, wherein the processor is configured with processor-executable instructions to perform operations such that determining whether the resource is the key asset comprises:
   receiving via a translation unit of the mobile device information identifying a component in the mobile device as a critical data resource;
   determining in the translation unit a section of memory that stores information for the component; and
   adding the determined section of memory to a key asset list stored in a memory of the mobile device.

14. The mobile device of claim 10, wherein the processor is configured with processor-executable instructions to perform operations further comprising:
   monitoring an instruction queue to identify an instruction sequence associated with the resource;
   determining whether an identified instruction sequence is associated with a malicious activity by comparing the identified instruction sequence to known patterns of malicious activities; and
   removing the identified instruction sequence from the instruction queue in response to determining that the identified instruction sequence is associated with the malicious activity.

15. The mobile device of claim 10, wherein the processor is configured with processor-executable instructions to perform operations such that determining whether the resource is the key asset comprises determining whether the resource is an asset selected from a group comprising:
   a memory block;
   a memory address;
   a memory addresses range;
   a device address;
   a register; and
   a hardware block.

16. The mobile device of claim 10, wherein the processor is configured with processor-executable instructions to perform operations further comprising:
   identifying in the behavioral monitoring and analysis system a pattern of application programming interface (API) calls as being indicative of malicious activity by the software application in response to determining that the software application is suspicious;
   generating a light-weight behavior signature based on the identified pattern of API calls;
   using the light-weight behavior signature to perform behavior analysis operations; and
   determining whether the software application is malicious or benign based on the behavior analysis operations.

17. A non-transitory computer readable storage medium having stored thereon processor-executable software instructions configured to cause a processor in a mobile device to perform operations for analyzing mobile device behaviors, the operations comprising:
   monitoring by a processor of a mobile device the mobile device behaviors to collect behavior information;
   generating a behavior vector using the collected behavior information;
   applying the generated behavior vector to a classifier model to generate an analysis result;
   determining whether a resource in the mobile device is susceptible to misuse based on the generated analysis result;
   determining via a hardware component of the mobile device whether the resource is a key asset that requires close monitoring in response to determining that the resource is susceptible to misuse based on the generated analysis result;
   monitoring via the hardware component the access or use of the resource by a software application to obtain low level behavior information in response to determining that the resource is a key asset that requires close monitoring;
   providing the obtained low level behavior information to a behavioral monitoring and analysis system of the mobile device; and
   determining in the behavioral monitoring and analysis system whether the software application is suspicious based on the low level behavior information obtained by the hardware component.

18. The non-transitory computer readable storage medium of claim 17, wherein the stored processor-executable software instructions are configured to cause a processor to perform operations such that providing the obtained low level behavior information from the hardware component to the behavioral monitoring and analysis system comprises:
   determining in the hardware component whether the access or use of the resource by the software application is suspicious; and
   notifying the behavioral monitoring and analysis system that the access or use of the resource by the software application is suspicious.

19. The non-transitory computer readable storage medium of claim 17, wherein the stored processor-executable software instructions are configured to cause a processor to perform operations such that monitoring in the hardware component the access or use of the resource by the software application to obtain low level behavior information comprises monitoring a data bus in a configurable hardware debug component to detect an application programming interface (API) call issued by the software application.

20. The non-transitory computer readable storage medium of claim 17, wherein the stored processor-executable software instructions are configured to cause a processor to perform operations such that determining whether the resource is the key asset comprises:
   receiving in a translation unit of the mobile device information identifying a component in the mobile device as a critical data resource;
   determining in the translation unit a section of memory that stores information for the component; and
   adding the determined section of memory to a key asset list stored in a memory of the mobile device.

* * * * *